US008667519B2

(12) United States Patent
Small et al.

(10) Patent No.: US 8,667,519 B2
(45) Date of Patent: Mar. 4, 2014

(54) AUTOMATIC PASSIVE AND ANONYMOUS FEEDBACK SYSTEM

(75) Inventors: Sheridan Martin Small, Seattle, WA (US); Andrew Fuller, Redmond, WA (US); Avi Bar-Zeev, Redmond, WA (US); Kathryn Stone Perez, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 176 days.

(21) Appl. No.: 12/945,691

(22) Filed: Nov. 12, 2010

(65) Prior Publication Data

US 2012/0124604 A1    May 17, 2012

(51) Int. Cl.
*H04N 7/16* (2011.01)
(52) U.S. Cl.
USPC ........ 725/12; 725/9; 725/10; 725/25; 725/42; 725/86; 725/115
(58) Field of Classification Search
USPC .................. 725/12, 9, 10, 25, 42, 86, 115
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |

(Continued)

FOREIGN PATENT DOCUMENTS

| CN | 101390390 A | 3/2009 |
|---|---|---|
| CN | 101398849 | 4/2009 |

(Continued)

OTHER PUBLICATIONS

U.S. Appl. No. 12/387,438, filed Apr. 30, 2009.

(Continued)

*Primary Examiner* — Jivka Rabovianski
(74) *Attorney, Agent, or Firm* — Judy Yee; Peter Taylor; Micky Minhas

(57) ABSTRACT

A system for generating passive and anonymous feedback of multimedia content viewed by users is disclosed. The multimedia content may include recorded video content, video-on-demand content, television content, television programs, advertisements, commercials, music, movies, video clips, and other on-demand media content. One or more of the users in a field of view of a capture device connected to the computing device are identified. An engagement level of the users to multimedia content being viewed by the users is determined by tracking movements, gestures, postures and facial expressions performed by the users. A report of the response to viewed multimedia content is generated based on the movements, gestures, postures and facial expressions performed by the users. The report is provided to rating agencies, content providers and advertisers. In one embodiment, preview content and personalized content related to the viewed multimedia content is received from the content providers and advertisers based on the report. The preview content and personalized content are displayed to the users.

19 Claims, 11 Drawing Sheets

(56) References Cited

U.S. PATENT DOCUMENTS

| | | | |
|---|---|---|---|
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,020,930 A | 2/2000 | Legrand | |
| 6,054,991 A | 4/2000 | Crane et al. | |
| 6,057,909 A | 5/2000 | Yahav et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,112,186 A * | 8/2000 | Bergh et al. | 705/7.32 |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,243,104 B1 | 6/2001 | Murray | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,699,127 B1 | 3/2004 | Lobb et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,710 B1 | 3/2005 | Cohen-Solal et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,028,269 B1 | 4/2006 | Cohen-Solal et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,076,741 B2 | 7/2006 | Miyaki | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,624,416 B1 | 11/2009 | Vandermolen et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |

(56) References Cited

U.S. PATENT DOCUMENTS

| | | |
|---|---|---|
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,814,513 B2 | 10/2010 | Sarukkai et al. |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,029,359 B2 | 10/2011 | Cheng |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,468,201 B2 | 6/2013 | DaSilva et al. |
| 8,494,907 B2 | 7/2013 | Lerman et al. |
| 2002/0062481 A1 | 5/2002 | Slaney et al. |
| 2002/0091568 A1 | 7/2002 | Kraft et al. |
| 2002/0155878 A1 | 10/2002 | Lert et al. |
| 2003/0078784 A1 | 4/2003 | Jordan et al. |
| 2003/0097408 A1 | 5/2003 | Kageyama et al. |
| 2003/0124973 A1 | 7/2003 | Sie et al. |
| 2003/0156134 A1 | 8/2003 | Kim |
| 2003/0237093 A1 | 12/2003 | Marsh |
| 2004/0030599 A1 | 2/2004 | Sie et al. |
| 2004/0100088 A1 | 5/2004 | Tellenbach et al. |
| 2004/0193425 A1 | 9/2004 | Tomes |
| 2005/0004930 A1 | 1/2005 | Hatta |
| 2005/0021397 A1 | 1/2005 | Cui et al. |
| 2005/0091680 A1 | 4/2005 | Kondo |
| 2005/0198661 A1 | 9/2005 | Collins et al. |
| 2005/0204381 A1 | 9/2005 | Ludvig et al. |
| 2005/0285966 A1 | 12/2005 | Bamji et al. |
| 2006/0015404 A1 | 1/2006 | Tran |
| 2006/0212900 A1 | 9/2006 | Ismail et al. |
| 2007/0050242 A1 | 3/2007 | Kralik |
| 2007/0061022 A1 | 3/2007 | Hoffberg-Borghesani et al. |
| 2007/0078708 A1 | 4/2007 | Yu et al. |
| 2007/0078709 A1 | 4/2007 | Rajaram |
| 2007/0100690 A1 | 5/2007 | Hopkins |
| 2007/0157237 A1* | 7/2007 | Cordray et al. ............... 725/42 |
| 2007/0157249 A1 | 7/2007 | Cordray et al. |
| 2007/0167689 A1 | 7/2007 | Ramadas et al. |
| 2007/0171286 A1 | 7/2007 | Ishii et al. |
| 2007/0214471 A1 | 9/2007 | Rosenberg |
| 2007/0243930 A1 | 10/2007 | Zalewski et al. |
| 2008/0004959 A1 | 1/2008 | Tunguz-Zawislak et al. |
| 2008/0026838 A1 | 1/2008 | Dunstan et al. |
| 2008/0030621 A1 | 2/2008 | Ciudad et al. |
| 2008/0033826 A1 | 2/2008 | Maislos et al. |
| 2008/0077952 A1 | 3/2008 | St. Jean et al. |
| 2008/0102947 A1 | 5/2008 | Hays et al. |
| 2008/0120112 A1 | 5/2008 | Jordan et al. |
| 2008/0140524 A1 | 6/2008 | Anand et al. |
| 2008/0147501 A1 | 6/2008 | Gilliam |
| 2008/0204450 A1 | 8/2008 | Dawson et al. |
| 2008/0215972 A1 | 9/2008 | Zalewski et al. |
| 2008/0262909 A1 | 10/2008 | Li et al. |
| 2008/0306817 A1 | 12/2008 | Amidon et al. |
| 2009/0025024 A1 | 1/2009 | Beser et al. |
| 2009/0059175 A1 | 3/2009 | Le Quesne et al. |
| 2009/0089837 A1 | 4/2009 | Momosaki |
| 2009/0112698 A1 | 4/2009 | Steelberg et al. |
| 2009/0118002 A1* | 5/2009 | Lyons et al. .............. 463/29 |
| 2009/0123069 A1 | 5/2009 | Deng et al. |
| 2009/0125374 A1 | 5/2009 | Deaton et al. |
| 2009/0133051 A1 | 5/2009 | Hildreth |
| 2009/0138805 A1 | 5/2009 | Hildreth |
| 2009/0158170 A1 | 6/2009 | Narayanan et al. |
| 2009/0169115 A1 | 7/2009 | Hu et al. |
| 2009/0171783 A1 | 7/2009 | Raju |
| 2009/0192874 A1 | 7/2009 | Powles et al. |
| 2009/0195392 A1 | 8/2009 | Zalewski |
| 2009/0199235 A1 | 8/2009 | Surendran et al. |
| 2009/0217315 A1* | 8/2009 | Malik et al. .............. 725/9 |
| 2009/0248505 A1 | 10/2009 | Finkelstein et al. |
| 2009/0249387 A1 | 10/2009 | Magdy et al. |
| 2009/0271261 A1 | 10/2009 | Mehta et al. |
| 2009/0271417 A1 | 10/2009 | Toebes et al. |
| 2009/0285545 A1 | 11/2009 | Bon |
| 2009/0298517 A1 | 12/2009 | Freer |
| 2009/0299843 A1 | 12/2009 | Shkedi |
| 2009/0300144 A1 | 12/2009 | Marr et al. |
| 2009/0325661 A1 | 12/2009 | Gross |
| 2009/0327073 A1 | 12/2009 | Li et al. |
| 2010/0023400 A1 | 1/2010 | DeWitt |
| 2010/0043040 A1 | 2/2010 | Olsen, Jr. |
| 2010/0070987 A1 | 3/2010 | Amento et al. |
| 2010/0071013 A1 | 3/2010 | Vandermolen et al. |
| 2010/0086204 A1 | 4/2010 | Lessing |
| 2010/0145797 A1 | 6/2010 | Hamilton, II et al. |
| 2010/0161409 A1 | 6/2010 | Ryu et al. |
| 2010/0205562 A1 | 8/2010 | de Heer |
| 2011/0063440 A1 | 3/2011 | Neustaedter et al. |
| 2011/0072047 A1 | 3/2011 | Wang et al. |
| 2011/0106375 A1 | 5/2011 | Sundaram |
| 2011/0169959 A1 | 7/2011 | De Angelis et al. |
| 2011/0238503 A1 | 9/2011 | Naini |
| 2011/0255736 A1 | 10/2011 | Thompson et al. |
| 2011/0295693 A1 | 12/2011 | Clavin et al. |
| 2011/0306397 A1 | 12/2011 | Fleming et al. |
| 2012/0077574 A1 | 3/2012 | Walker et al. |
| 2012/0093481 A1 | 4/2012 | McDowell et al. |

FOREIGN PATENT DOCUMENTS

| | | |
|---|---|---|
| CN | 101254344 B | 6/2010 |
| EP | 0583061 A2 | 2/1994 |
| JP | 08044490 A1 | 2/1996 |
| KR | 20090064814 A | 6/2009 |
| KR | 20100076498 A | 7/2010 |
| WO | 93/10708 A1 | 6/1993 |
| WO | 97/17598 A1 | 5/1997 |
| WO | 99/44698 A1 | 9/1999 |
| WO | 2009067670 A1 | 5/2009 |
| WO | 2009079560 A1 | 6/2009 |
| WO | 2009148833 A1 | 12/2009 |

OTHER PUBLICATIONS

Office Action dated Jul. 6, 2011, U.S. Appl. No. 12/387,438, filed Apr. 30, 2009, 80 pages.

Response to Office Action dated Dec. 6, 2011 U.S. Appl. No. 12/387,438, filed Apr. 30, 2009, 13 pages.

Final Office Action dated Feb. 14, 2012, U.S. Appl. No. 12/387,438, filed Apr. 30, 2009, 37 pages.

Seles, Sheila Murphy, "Audience Research for Fun and Profit: Rediscovering the Value of Television Audiences", Submitted to the program in Comparative Media Studies, Jun. 2010, 128 pages, Massachusetts Institute of Technology.

Owyang, "Contextual Ads Based Off Social Network Profile: Twitter and Facebook", Web Strategy [online], Jun. 18, 2009 [retrieved on Jun. 22, 2010], Retrieved from the Internet: <URL: http://www.web-strategist.com/blog/2009/06/18/contextual-ads-based-off-social-network-profile-twitter-and-facebook/>, 10 pages.

Hsieh, et al., "Personalized Advertising Strategy for Integrated Social Networking Websites", IEEE/WIC/ACM International Conference on Web Intelligence and Intelligent Agent Technology, Dec. 2008, pp. 369-372, IEEE Computer Society Washington, DC, USA, 4 pages.

Kim, "IAB Social Advertising Best Practices", The IAB User-Generated Content & Social Media Committee, May 2009, [online], [retrieved on Jun. 22, 2010] Retrieved from the Social Media of IAB using Internet ,<URL: http://www.iab.net/media/file/Social-Advertising-Best-Practices-0509.pdf>, 19 pages.

"Audio Advertisement Recognition." SIGNALogic [online]. Retrieved from the Internet on Sep. 8, 2010: URL: <http://www.signalogic.com/index.pl?page=ad_recog>, 2 pages.

(56) References Cited

OTHER PUBLICATIONS

U.S. Appl. No. 12/886,141, filed Sep. 20, 2010.
U.S. Appl. No. 12/963,348, filed Dec. 8, 2010.
Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.
Miyagawa et al., "CCD-Based Range Finding Sensor", Oct. 1997, pp. 1648-1652, vol. 44 No. 10, IEEE Transactions on Electron Devices.
Rosenhahn et al., "Automatic Human Model Generation", 2005, pp. 41-48, University of Auckland (CITR), New Zealand.
Aggarwal et al., "Human Motion Analysis: A Review", IEEE Nonrigid and Articulated Motion Workshop, 1997, pp. 90-102, University of Texas at Austin, Austin, TX.
Shao et al., "An Open System Architecture for a Multimedia and Multimodal User Interface", Aug. 24, 1998, 8 pages, Japanese Society for Rehabilitation of Persons with Disabilities (JSRPD), Japan.
Kohler, "Special Topics of Gesture Recognition Applied in Intelligent Home Environments", In Proceedings of the Gesture Workshop, 1998, pp. 285-296, Germany.
Kohler, "Vision Based Remote Control in Intelligent Home Environments", University of Erlangen-Nuremberg/Germany, 1996, pp. 147-154, Germany.
Kohler, "Technical Details and Ergonomical Aspects of Gesture Recognition applied in Intelligent Home Environments", 1997, 35 pages, Germany.
Hasegawa et al., "Human-Scale Haptic Interaction with a Reactive Virtual Human in a Real-Time Physics Simulator", Jul. 2006, 12 pages, vol. 4, No. 3, Article 6C, ACM Computers in Entertainment, New York, NY.
Qian et al., "A Gesture-Driven Multimodal Interactive Dance System", Jun. 2004, pp. 1579-1582, IEEE International Conference on Multimedia and Expo (ICME), Taipei, Taiwan.
Zhao, "Dressed Human Modeling, Detection, and Parts Localization", 2001, 121 pages, The Robotics Institute, Carnegie Mellon University, Pittsburgh, PA.
He, "Generation of Human Body Models", Apr. 2005, 111 pages, University of Auckland, New Zealand.
Isard et al., "Condensation—Conditional Density Propagation for Visual Tracking", 1998, pp. 5-28, International Journal of Computer Vision 29(1), Netherlands.
Livingston, "Vision-based Tracking with Dynamic Structured Light for Video See-through Augmented Reality", 1998, 145 pages, University of North Carolina at Chapel Hill, North Carolina, USA.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.
Breen et al., "Interactive Occlusion and Collision of Real and Virtual Objects in Augmented Reality", Technical Report ECRC-95-02, 1995, European Computer-Industry Research Center GmbH, Munich, Germany.
Freeman et al., "Television Control by Hand Gestures", Dec. 1994, Mitsubishi Electric Research Laboratories, TR94-24, Caimbridge, MA.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, pp. 602-605, vol. 15, No. 6, IEEE Transactions on Pattern Analysis and Machine Intelligence.
Granieri et al., "Simulating Humans in VR", The British Computer Society, Oct. 1994, pp. 1-4, 6-9, 12, 15-16, and 18-21 (15 pages) Academic Press.
Brogan et al., "Dynamically Simulated Characters in Virtual Environments", Sep./Oct. 1998, pp. 58-69, vol. 18, Issue 5, IEEE Computer Graphics and Applications.
Fisher et al., "Virtual Environment Display System", ACM Workshop on Interactive 3D Graphics, Oct. 1986, 12 pages, Chapel Hill, NC.
"Virtual High Anxiety", Tech Update, Aug. 1995, pp. 22.
Sheridan et al., "Virtual Reality Check", Technology Review, Oct. 1993, pp. 21-28, vol. 96, No. 7.
Stevens, "Flights into Virtual Reality Treating Real-World Disorders", The Washington Post, Mar. 27, 1995, Science Psychology, 2 pages.
"Simulation and Training", 1994, 6 pages, HP Division Incorporated.
English Machine-translation of Japanese Publication No. JP08-044490 published on Feb. 16, 1996.
Response to Office Action dated Aug. 14, 2012 U.S. Appl. No. 12/387,438, filed Apr. 30, 2009,11 pages.
Office Action dated Oct. 31, 2012 in Chinese Patent Application No. 201110291300.6, 11 pages.
Office Action dated Dec. 7, 2012 in U.S. Appl. No. 12/963,348, 63 pages.
Ng, et al., "Collages as Dynamic Summaries of Mined Video Content for Intelligent Multimedia Knowledge Management," Carnegie Mellon University, Computer Science Dept., [http://www.informedia.cs.cmu.edu/documents/aaai03_ng.pdf], Mar. 24-26, 2003, 10 pages.
Graham, et al., "The Video Paper Multimedia Playback System," Ricoh Innovations, Inc., [http://www.rii.ricoh.com/~jame/acm-mm-2003-videopaper.pdf], Nov. 2-8, 2003, 2 pages.
Correia, et al., "HyperMem: A System to Store and Replay Experiences in Mixed Reality Worlds," Proceedings of the 2005 International Conference on Cyberworlds (CW '05), IEEE Computer Society, Nov. 23-25, 2005, 8 pages.
Brundell, et al., "The Experience of Using Digital Replay System for Social Science Research," [http://www.mrl.nott.ac.uk/~axc/DReSS_Outputs/ICeSS_2_2008.pdf], Retrieved Jul. 6, 2010.
Correia, et al., "Storing and Replaying Experiences in Mixed Environments using Hypermedia," [http://74.125.155.132/scholar?q=cache:7nVs3h_o7awJ:scholar.google.com/+video+%2B+content+marker+%2B+point+of+interest+%2B+playback&hl=en&as_sdt=2000], Retrieved Jul. 6, 2010.
Toyama, et al., "Probabilistic Tracking in a Metric Space," Eighth International Conference on Computer Vision, Vancouver, Canada, vol. 2, Jul. 2001, 8 pages.
Office Action dated Jun. 26, 2012 in U.S. Appl. No. 12/905,880, 6 pages.
Response to Office Action mailed Jul. 26, 2012 in U.S. Appl. No. 12/905,880, 9 pages.
Office Action dated Oct. 10, 2012 in U.S. Appl. No. 12/905,880, 32 pages.
Response to Office Action filed Feb. 11, 2013 in U.S. Appl. No. 12/905,880, 11 pages.
Response to Office Action filed Jan. 18, 2013 in U.S. Appl. No. 12/791,646, 9 pages.
Response to Office Action filed Mar. 7, 2013 in U.S. Appl. No. 12/963,348, 12 pages.
Response to Office Action filed Sep. 25, 2013 in U.S. Appl. No. 12/791,646, 11 pages.
Office Action dated Sep. 25, 2013 in U.S. Appl. No. 12/905,880, 56 pages.
Office Action dated Oct. 2, 2013 in U.S. Appl. No. 12/963,348, 24 pages.
Office Action dated Oct. 3, 2013 in U.S. Appl. No. 12/387,438, 59 pages.
Office Action dated Aug. 22, 2012 in U.S. Appl. No. 12/791,646, 63 pages.
Robertson, Mark R., "The First Contextual Ad Platform to Leverage Image & Video Recognition Technologies Launched Today," The Online Video Marketer's Guide, [http://www.reelseo.com/contextual-recognition-advertising/], Oct. 13, 2008, 8 pages.
First Office Action dated Sep. 13, 2012, Chinese Patent Application No. 201110158984.2, 14 pages.
Response to First Office Action filed Jan. 22, 2013, Chinese Patent Application No. 201110158984.2, 5 pages.

(56) References Cited

OTHER PUBLICATIONS

Second Office Action dated Jun. 8, 2013 in Chinese Patent Application No. 201110158984.2, 24 pages.
English Abstract for CN101398849 published Apr. 1, 2009.
Response to Second Office Action filed Aug. 4, 2013, Chinese Patent Application No. 201110158984.2, 23 pages.
Response to Office Action filed Aug. 13, 2013 in U.S. Appl. No. 12/963,348, 11 pages.
Response to Office Action filed Aug. 22, 2013 in U.S. Appl. No. 12/905,880, 13 pages.
Office Action dated Aug. 28, 2013 in U.S. Appl. No. 12/886,141, 29 pages.
International Search Report dated Apr. 10, 2012 in International Patent Application No. PCT/US/2011/048706. 3 pages.
International Preliminary Report on Patentability dated Mar. 26, 2013 in International Patent Application No. PCT/US/2011/048706. 5 pages.
English Abstract for KR20100076498 published Jul. 6, 2010.
English Abstract for KR20090064814 published Jun. 22, 2009.
Response to Second Office Action filed Aug. 19, 2013, Chinese Patent Application No. 201110291300.6, 20 pages.
Office Action dated Jan. 30, 2013 in U.S. Appl. No. 12/886,141, 73 pages.
Response to Office Action filed Mar. 11, 2013 (and English language Summary of the Arguments) in Chinese Patent Application No. 201110291300.6, 4 pages.
Office Action dated Mar. 25, 2013 in U.S. Appl. No. 12/791,646, 23 pages.
Response to Office Action filed Apr. 30, 2013 in U.S. Appl. No. 12/886,141, 14 pages.
Office Action dated May 13, 2013 in U.S. Appl. No. 12/963,348, 9 pages.
Final Office Action dated May 22, 2013 in U.S. Appl. No. 12/905,880, 19 pages.
Second Office Action dated Jun. 4, 2013 in Chinese Patent Application No. 201110291300.6, 15 pages.
First Office Action dated Nov. 27, 2013 with partial English translation, Chinese Patent Application No. 201110371508.9, 20 pages.
English Abstract for CN101390390 published Mar. 18, 2009, 3 pages.

* cited by examiner

AUTOMATIC PASSIVE AND ANONYMOUS FEEDBACK SYSTEM

BACKGROUND

Television rating systems rely on self-recorded paper diaries or electronic metering technology to measure the number of people watching a television program or show. For example, rating systems typically utilize electronic meters that are placed near television sets to determine when a television set is on, what channel the television set is tuned to and how many people are watching a particular television program. Rating systems typically utilize a representative sample of a population to gather a certain amount of data about a general population. In addition, paper diaries utilized by rating systems are generally affected by response biases by viewers of television shows or programs.

SUMMARY

Disclosed herein is a method and system that generates passive and anonymous feedback of multimedia content viewed by users by tracking movements, gestures, postures, vocal responses, and facial expressions performed by the users, while the users view the multimedia content. The multimedia content may include recorded video content, video-on-demand content, television content, television programs, advertisements, commercials, music, movies, video clips, and other on-demand media content. In one embodiment of the disclosed technology, a user's presence in a field of view while the user views program content via the user's computing device is detected. The type of program content being viewed by the user, the user's demographic information and the user's program viewing history is determined. The detection of the user's presence, the program content, the user's demographic information and the user's program viewing history is utilized by rating agencies, content providers and advertisers to provide preview content and personalized content related to the program viewed by the user.

In another embodiment, a user's engagement level to a viewed program is determined by tracking movements, gestures, postures and facial expressions performed by the user. The user's movements, gestures, postures and facial expressions are provided to one or more of rating agencies, content providers and advertisers. In one embodiment, the user's gestures, postures, movements and facial expressions are utilized by content providers and advertisers to provide preview content and personalized content related to a program viewed by a user. The preview content and the personalized content are displayed to the user via a display device. In another embodiment, the disclosed technology enables the polling and aggregation of responses to viewed multimedia content from a large number of households to generate a large user-response data set for analysis by content providers and advertisers.

In one embodiment, a method for generating passive and anonymous feedback of multimedia content viewed by users is disclosed. The method includes receiving and displaying multimedia content associated with a current broadcast. The method includes identifying one or more of the users in a field of view of a capture device connected to a computing device and automatically determining an engagement level of the users to the multimedia content being viewed by the users. In one embodiment, the engagement level of the users is determined by tracking the movements, gestures, postures, audio responses, and facial expressions performed by the users. The method further includes automatically generating a report of a response to the multimedia content viewed by each user identified by the capture device based on the movements, gestures, postures, audio responses and facial expressions performed by the users. The report is transmitted to a remote computing system for analysis.

In one embodiment, preview content related to a program viewed by the user is received from content providers and advertisers based on the report. The preview content is displayed to the user via an audio visual device connected to a computing device. In another embodiment, personalized content related to a program viewed by the user is received from the content providers and advertisers based on the report. The personalized content is displayed to the user via an audio visual device connected to a computing device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Technology is disclosed by which a user's response to viewed multimedia content is obtained by tracking the user's movements, gestures, postures and facial expressions while viewing the multimedia content. Multimedia content may be received at a computing device or at an audiovisual device connected to the computing device. A capture device connected to the computing device identifies one or more users in a field of view and tracks the users' movements, gestures, postures and facial expressions while the users view the multimedia content. In one embodiment, the computing device determines a user's engagement level to a television program being viewed by the user based on the user's movements, gestures, postures and facial expressions. The computing device generates a user-specific report of a response to the viewed program for each user identified by the capture device based on the gestures, postures, movements and facial expressions performed by each of the users. The user-specific report is provided to one or more rating agencies, content providers and advertisers. In one embodiment, the computing device receives preview content related to a viewed program or personalized content related to a viewed program for the users based on the user-specific report, from the content providers or advertisers. In another embodiment, the computing device may also receive preview content or personalized content related to a program viewed by a user based on detecting the user's presence in a field of view of the user's computing device while the user views the program, the type of program viewed by the user, the user's demographic information and the user's program viewing history. For example, if it is determined that a male user in the age group 30-35 is watching a science fiction program and the user's program viewing history indicates the user's preference for science fiction, then the user may receive preview content that contains a snippet of the next episode of the science fiction program or personalized content that contains a selection of a set of science fiction programs that the user would like to view. The responses to viewed multimedia content may be polled from multiple users in multiple households and the aggregated responses of the multiple users may be transmitted to a remote computing system for analysis by content providers and advertisers.

Figure 1:
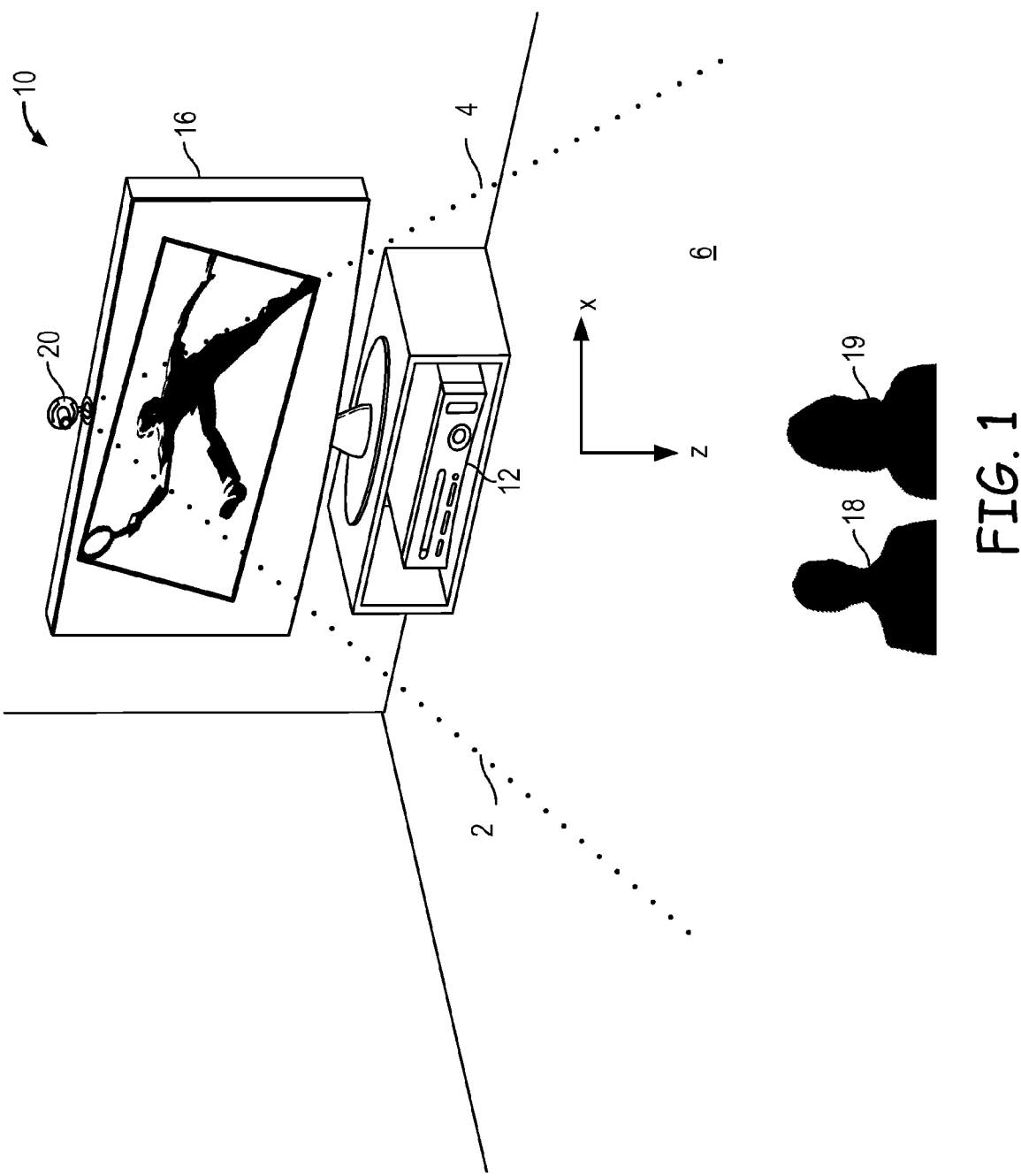
FIG. 1 illustrates one embodiment of a target recognition, analysis and tracking system for performing the operations of the disclosed technology.

FIG. 1 illustrates one embodiment of a target recognition, analysis and tracking system 10 (generally referred to as a tracking system hereinafter) for performing the operations of the disclosed technology. The target recognition, analysis and tracking system 10 may be used to recognize, analyze, and/or track one or more human targets such as users 18 and 19. As shown in FIG. 1, the tracking system 10 may include a computing device 12. In one embodiment, computing device 12 may be implemented as any one or a combination of a wired and/or wireless device, as any form of television client device (e.g., television set-top box, digital video recorder (DVR), etc.), personal computer, mobile computing device, portable computer device, media device, communication device, video processing and/or rendering device, appliance device, gaming device, electronic device, and/or as any other type of device that can be implemented to receive media content in any form of audio, video, and/or image data. According to one embodiment, the computing device 12 may include hardware components and/or software components such that the computing device 12 may be used to execute applications such as gaming applications, non-gaming applications, or the like. In one embodiment, computing device 12 may include a processor such as a standardized processor, a specialized processor, a microprocessor, or the like that may execute instructions stored on a processor readable storage device for performing the processes described herein.

As shown in FIG. 1, the tracking system 10 may further include a capture device 20. The capture device 20 may be, for example, a camera that may be used to visually monitor one or more users, such as the users 18 and 19, such that movements, postures and gestures performed by the users may be captured and tracked by the capture device 20.

According to one embodiment, computing device 12 may be connected to an audiovisual device 16 such as a television, a monitor, a high-definition television (HDTV), or the like that may provide visuals and/or audio to users 18 and 19. For example, the computing device 12 may include a video adapter such as a graphics card and/or an audio adapter such as a sound card that may provide the audiovisual signals to a user. The audiovisual device 16 may receive the audiovisual signals from the computing device 12 and may output visuals and/or audio associated with the audiovisual signals to the users 18 and 19. According to one embodiment, the audiovisual device 16 may be connected to the computing device 12 via, for example, an S-Video cable, a coaxial cable, an HDMI cable, a DVI cable, a VGA cable, or the like.

In one embodiment, capture device 20 tracks one or more movements, gestures and postures performed by users 18, 19 within a field of view, 6, of the capture device 20. Lines 2 and 4 denote a boundary of the field of view 6. In one embodiment, computing device 12 determines a user's response to multimedia content being viewed via the audio visual device 16 based on the user's movements, postures and gestures tracked by the capture device 12. Multimedia content can include any type of audio, video, and/or image media content received from media content sources such as content providers, broadband, satellite and cable companies, advertising agencies the internet or video streams from a web server. As described herein, multimedia content can include recorded video content, video-on-demand content, television content, television programs, advertisements, commercials, music, movies, video clips, and other on-demand media content. Other multimedia content can include interactive games, network-based applications, and any other content or data (e.g., program guide application data, user interface data, advertising content, closed captions data, content metadata, search results and/or recommendations, etc.). The operations performed by the capture device 20 and the computing device 12 are discussed in detail below.

Figure 2:
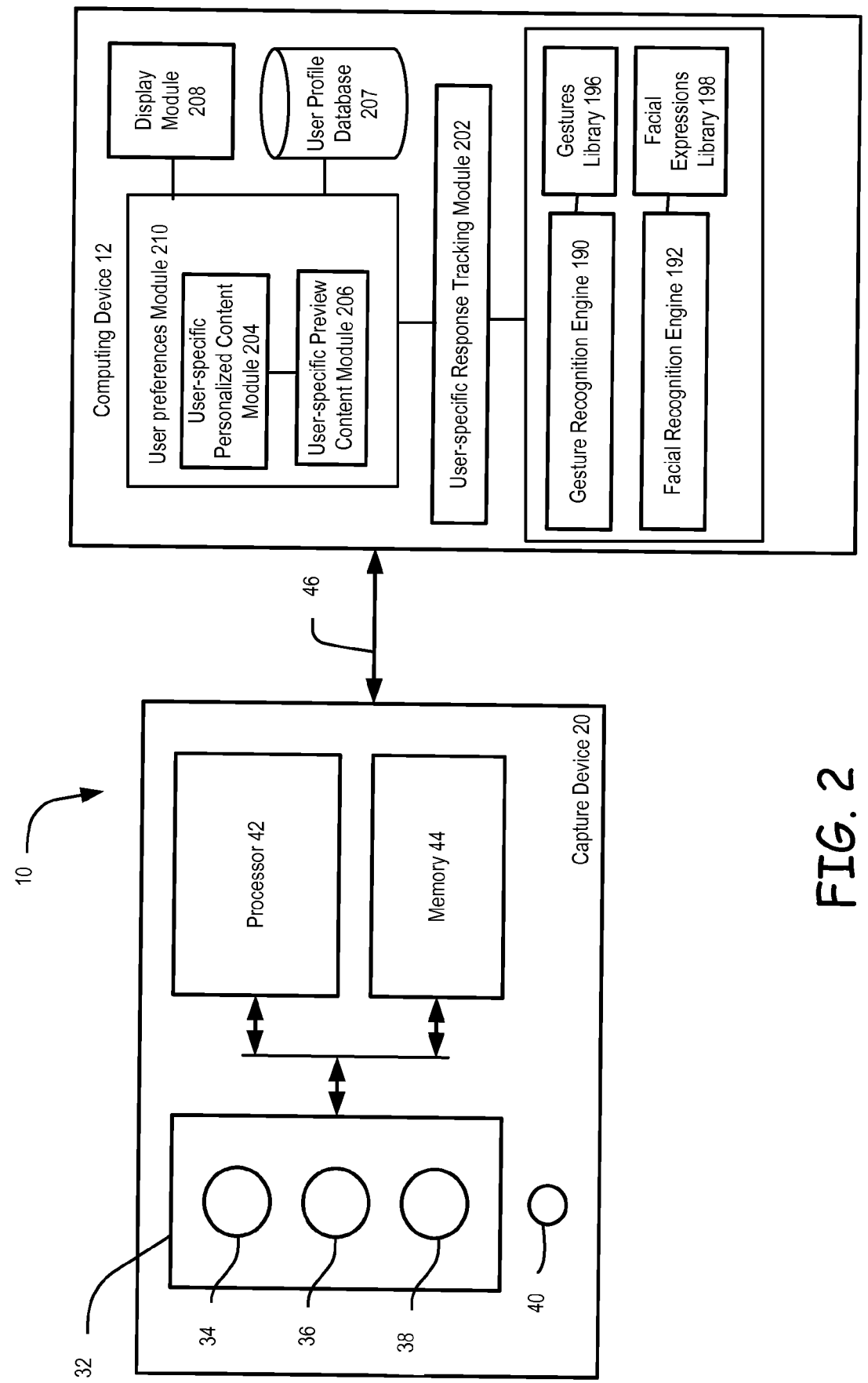
FIG. 2 illustrates one embodiment of a capture device that may be used as part of the tracking system.

FIG. 2 illustrates one embodiment of a capture device 20 and computing device 12 that may be used in the target recognition, analysis and tracking system 10 to recognize human and non-human targets in a capture area and uniquely identify them and track them in three dimensional space. According to one embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z-axis extending from the depth camera along its line of sight.

As shown in FIG. 2, the capture device 20 may include an image camera component 32. According to one embodiment, the image camera component 32 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, the image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more targets and objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects.

According to one embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more targets or objects in the capture area, the pattern may become deformed in response. Such a deformation of the pattern may be captured by, for example, the 3-D camera 36 and/or the RGB camera 38 and may then be analyzed to determine a physical distance from the capture device to a particular location on the targets or objects.

According to one embodiment, the capture device 20 may include two or more physically separated cameras that may view a capture area from different angles, to obtain visual stereo data that may be resolved to generate depth information. Other types of depth image sensors can also be used to create a depth image.

The capture device 20 may further include a microphone 40. The microphone 40 may include a transducer or sensor that may receive and convert sound into an electrical signal. According to one embodiment, the microphone 40 may be used to reduce feedback between the capture device 20 and the computing device 12 in the target recognition, analysis and tracking system 10. Additionally, the microphone 40 may be used to receive audio signals that may also be provided by the user to control applications such as game applications, non-game applications, or the like that may be executed by the computing device 12.

In one embodiment, the capture device 20 may further include a processor 42 that may be in operative communication with the image camera component 32. The processor 42 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction.

The capture device 20 may further include a memory component 44 that may store the instructions that may be executed by the processor 42, images or frames of images captured by the 3-D camera or RGB camera, user profiles or any other suitable information, images, or the like. According to one example, the memory component 44 may include random access memory (RAM), read only memory (ROM), cache, Flash memory, a hard disk, or any other suitable storage component. As shown in FIG. 2, the memory component 44 may be a separate component in communication with the image capture component 32 and the processor 42. In another embodiment, the memory component 44 may be integrated into the processor 42 and/or the image capture component 32. In one embodiment, some or all of the components 32, 34, 36, 38, 40, 42 and 44 of the capture device 20 illustrated in FIG. 2 are housed in a single housing.

The capture device 20 may be in communication with the computing device 12 via a communication link 46. The communication link 46 may be a wired connection including, for example, a USB connection, a Firewire connection, an Ethernet cable connection, or the like and/or a wireless connection such as a wireless 802.11b, g, a, or n connection. The computing device 12 may provide a clock to the capture device 20 that may be used to determine when to capture, for example, a scene via the communication link 46.

The capture device 20 may provide the depth information and images captured by, for example, the 3-D (or depth) camera 36 and/or the RGB camera 38, to the computing device 12 via the communication link 46. The computing device 12 may then use the depth information and captured images to perform one or more operations of the disclosed technology, as discussed in detail below.

In one set of operations performed by the disclosed technology, multimedia content associated with a current broadcast is initially received from one or more media content sources such as content providers, broadband, satellite and cable companies, advertising agencies, the internet or video streams from a web server. The multimedia content may be received at the computing device 12 or at the audiovisual device 16 connected to the computing device 12. The multimedia content may be received over a variety of networks. Suitable types of networks that may be configured to support the provisioning of multimedia content services by a service provider may include, for example, telephony-based networks, coaxial-based networks and satellite-based networks. In one embodiment, the multimedia content is displayed via the audiovisual device 16 to the users. The multimedia content can include recorded video content, video-on-demand content, television content, television programs, advertisements, commercials, music, movies, video clips, and other on-demand media content.

In one embodiment, multimedia content associated with the current broadcast is identified. In one example, the multimedia content identified may be a television program, movie, a live performance or a sporting event. For example, the multimedia content may be identified as a television program by identifying the channel and the program that the television set is tuned to during a specific time slot from metadata embedded in the content stream or from an electronic program guide provided by a service provider. In one embodiment, the audio visual device 16 connected to the computing device 12 identifies the multimedia content associated with the current broadcast. In another embodiment, computing device 12 may also identify the multimedia content associated with the current broadcast.

In one embodiment, capture device 20 initially captures one or more users viewing multimedia content in a field of view, 6, of the capture device. Capture device 20 provides a visual image of the captured users to the computing device 12. Computing device 12 performs the identification of the users captured by the capture device 20. In one embodiment, computing device 12 includes a facial recognition engine 192 to perform the identification of the users. Facial recognition engine 192 may correlate a user's face from the visual image received from the capture device 20 with a reference visual image to determine the user's identity. In another example, the user's identity may be also determined by receiving input from the user identifying their identity. In one embodiment, users may be asked to identify themselves by standing in front of the computing system 12 so that the capture device 20 may capture depth images and visual images for each user. For example, a user may be asked to stand in front of the capture device 20, turn around, and make various poses. After the computing system 12 obtains data necessary to identify a user, the user is provided with a unique identifier identifying the user. More information about identifying users can be found in U.S. patent application Ser. No. 12/696,282, "Visual Based Identity Tracking" and U.S. patent application Ser. No. 12/475,308, "Device for Identifying and Tracking Multiple Humans over Time," both of which are incorporated herein by reference in their entirety. In another embodiment, the user's identity may already be known by the computing device when the user logs into the computing device, such as, for example, when the computing device is a mobile computing device such as the user's cellular phone. In another embodiment, the user's identity may also be determined using the user's voice print.

In one embodiment, the user's identification information may be stored in a user profile database 207 in the computing device 12. The user profile database 207 may include information about the user such as a unique identifier associated with the user, the user's name and other demographic information related to the user such as the user's age group, gender and geographical location, in one example. The user profile database 207 may also include information about the user's program viewing history, such as a list of programs viewed by the user and recent movies or songs purchased by the user.

In one set of operations performed by the disclosed technology, capture device 20 tracks the users' movements, gestures, postures and facial expressions while the users' view multimedia content via the audio visual device 16. In one example, the gestures, postures and movements tracked by the capture device may include detecting if a user moves away from the field of view of the capture device 20 or turns away from the audio visual device 16 while viewing the program, stays within the field of view of the capture device 20, faces the audio visual device 16 or leans forward or talks to the display screen of the audio visual device 16 while viewing the program. Similarly, facial expressions tracked by the capture device 20 may include detecting smiles, laughter, cries, frowns, yawns or applauses from the user while the user views the program.

In one embodiment, computing device 12 includes a gestures library 196 and a gesture recognition engine 190. Gestures library 196 includes a collection of gesture filters, each comprising information concerning a movement, gesture or posture that may be performed by the user. In one embodiment, gesture recognition engine 190 may compare the data captured by the cameras 36, 38 and device 20 in the form of the skeletal model and movements associated with it to the gesture filters in the gesture library 192 to identify when a user (as represented by the skeletal model) has performed one or more gestures or postures. Computing device 12 may use the gestures library 192 to interpret movements of the skeletal model to perform one or more operations of the disclosed technology. More information about the gesture recognition engine 190 can be found in U.S. patent application Ser. No. 12/422,661, "Gesture Recognition System Architecture," filed on Apr. 13, 2009, incorporated herein by reference in its entirety. More information about recognizing gestures and postures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated by reference herein in their entirety. More information about motion detection and tracking can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety.

Facial recognition engine 192 in computing device 12 may include a facial expressions library 198. Facial expressions library 198 includes a collection of facial expression filters, each comprising information concerning a user's facial expression. In one example, the facial recognition engine 192 may compare the data captured by the cameras 36, 38 in the capture device 20 to the facial expression filters in the facial expressions library 198 to identify a user's facial expression. In another example, facial recognition engine 192 may also compare the data captured by the microphone 40 in the capture device 20 to the facial expression filters in the facial expressions library 198 to identify one or more vocal or audio responses, such as, for example, sounds of laughter or applause from a user. Audio responses may also include, for example, singing, saying lines with a character appearing in the program content, commentary from the user etc.

In another embodiment, the user's movements, gestures, postures and facial expressions may also be tracked using one or more additional sensors that may be positioned in a room in which the user is viewing multimedia content via the audio-visual device or placed, for example, on a physical surface (such as a tabletop) in the room. The sensors may include, for example, one or more active beacon sensors that emit structured light, pulsed infrared light or visible light onto the physical surface, detect backscattered light from the surface of one or more objects on the physical surface and track movements, gestures, postures and facial expressions performed by the user. The sensors may also include biological monitoring sensors, user wearable sensors or tracking sensors that can track movements, gestures, postures and facial expressions performed by the user.

In one embodiment, the disclosed technology provides a mechanism by which a user's privacy concerns are met while interacting with the target recognition and analysis system 10 by anonymizing the user's profile information prior to tracking the user's movements, gestures, postures and facial expressions. In one example, an opt-in by the user to the tracking of the user's movements, gestures, postures and facial expressions while viewing a program is also obtained from the user before implementing the disclosed technology. The opt-in may display an option with text such as, "Do you consent to the tracking of your movements, gestures, postures and facial expressions?" The option may be displayed to the user during initial set up of the user's system, each time the user logs into the system or during specific sessions such as just before the user starts watching a movie or a program.

In another set of operations performed by the disclosed technology, computing system 12 determines a user's engagement level to multimedia content viewed by the user such as a television program, based on the user's movements, gestures, postures, audio responses and facial expressions tracked by the capture device 12. In one embodiment, capture device 12 may track a user's gestures, postures, movements and facial expressions during consecutive time intervals that span the length of the duration of the program and computing device 12 may determine an engagement level of the program viewed by the user during the consecutive time intervals, based on the gestures, postures, movements and facial expressions performed by the user during each consecutive time interval. It is to be appreciated that the tracking of a user's gestures, postures, movements and facial expressions during consecutive time intervals that comprise the duration of a program enables the determination of a user's engagement level to specific portions of the program and also the determination of the specific portions of the viewed program that caused a specific engagement level from the user.

In one embodiment, computing device 12 includes a user-specific response tracking module 202. User-specific response tracking module 202 determines a user's engagement level to a program being viewed by the user based on the gestures, postures, audio responses, movements and facial expressions performed by the user while viewing the program content. In one example, the engagement level of the user may be determined to be one of "positive", "satisfactory" or "negative" based on the types of movements, gestures, postures, audio responses and facial expressions performed by the user while viewing the program.

In one example, the engagement level of the user is determined to be "negative" if the user's postures or gestures indicate that the user moved away from the field of view of the capture device or if the user's head was turned away from the audio visual device while viewing the program or if the user was using another device (such as the user's phone, lap top or personal computer) while viewing the program. Similarly, the engagement level of the user is determined to be "negative" if the user's facial expression indicated one of boredom or if a user's vocal or audio response indicated a yawn. The user's engagement level to a program viewed by a user may be determined to be "satisfactory" if the gestures and postures performed by the user indicate that the user faced the display and was in the field of view for a threshold percentage of time while viewing the program, in one example. The threshold percentage of time may be pre-determined by the computing device 12, in one implementation. Similarly, the engagement level to a program viewed by a user may be determined to "positive" if the user was within the field of view of the capture device for the entire duration of the program, faced the audio visual device 16, or, leaned forward while viewing the program. It is to be appreciated that the types of gestures, postures movements and facial expressions utilized to determine the user's engagement level while viewing a program as discussed above are for illustrative purposes and different combinations of gestures, postures, audio responses, movements and facial expressions may also be utilized to determine a user's engagement levels to a viewed program, in other embodiments. For example, an engagement level of the user may also be determined by detecting the user's presence in the field of view of the computing device as soon as the user hears a sound of laughter or applause from the program content being displayed via the user's computing device.

In another example, the engagement level of the user may also be determined based on detecting the duration of time that the user was engaged while viewing the program (for example, by detecting the duration of time that the user faced the display while viewing the program content). For example, the user may watch a program for the first five minutes, perform other activities on other devices such as the user's phone or personal computer for fifteen minutes and then watch the program again for another ten minutes and so forth.

In one embodiment, the user-specific response tracking module 202 generates a user-specific report of a response to a viewed program for each user identified by the capture device 20 based on the gestures, postures, movements and facial expressions performed by each of the users. In one example, the user-specific report of a response to a viewed program may be implemented as a table with fields such as one or more time intervals that comprise the length of the duration of the program, the movement, postures or gestures and facial expressions performed by a user during each time interval and the user's engagement level to the viewed program during each time interval. An exemplary illustration of a user-specific report of a response to a viewed program is illustrated in Table-1 as shown below:

TABLE 1

| User-specific report of a response to a viewed program | | | |
|---|---|---|---|
| Time-interval | Movement/Gestures/Postures | Facial Expressions | Engagement Level |
| start-t1 | User faced display, user was in field of view | Applause, laughter | Positive |
| t1-t2 | User moved away from field of view | None | Negative |
| t2-end | User faced display and was in field of view for a threshold percentage of time | None | Satisfactory |

In another embodiment, the user-specific response tracking module 202 may also generate a user-specific report of the average response to one or more viewed programs by each user identified by the capture device 20. In one example, the user-specific report of the average response to programs viewed by a user may include information such as one or more programs viewed by a user over a period of time, the program genre, the percentage of program episodes viewed by the user and the user's average engagement level while watching each program episode. In one embodiment, the user's average engagement level may be determined by assigning numeric values to the positive, satisfactory or negative engagement levels obtained from the user over the duration of the viewed program, determining the average of the numeric values corresponding to the engagement levels and computing the average engagement level by determining if the average of the numeric values falls within a pre-defined range of values.

For example, suppose a negative, satisfactory and a positive engagement level is obtained during consecutive time intervals, and the numeric values assigned to a negative engagement level is 1, a satisfactory engagement level is 5 and a positive engagement level is 10, and the pre-defined range of values for a negative engagement level is (1-4), a satisfactory engagement level is (4-6) and a positive engagement level is (6-10), then the user's average engagement level to the viewed program is determined to be "satisfactory", in one implementation, based on the average of the numeric values which in this example is 5.3, and the pre-defined range of numeric values, which in this example is (4-6). In one example, the user's average engagement level to a viewed program may be displayed as a list of the user's engagement levels to each program episode viewed by the user. An exemplary illustration of a user-specific report of the average response to a set of viewed programs is illustrated in "Table-2" as shown below:

TABLE 2

User-specific report of the average response to viewed programs

| Viewed Programs | Program Genre | Percentage of program episodes viewed by user | Average engagement level while viewing each program episode |
|---|---|---|---|
| Program-1 | Sci-Fi | 80% | {Positive, Satisfactory, Satisfactory, Positive, Negative, Positive, Positive, Satisfactory} |
| Program-2 | Adventure | 50% | {Satisfactory, Positive, Satisfactory, Satisfactory, Positive} |
| Program-n | Fantasy | 70% | {Positive, Positive, Satisfactory, Negative, Satisfactory, Positive, Positive} |

It is to be appreciated that the user-specific reports generated in Table-1 and Table-2 provide passive and anonymous feedback of program content viewed by a user by providing a detailed analysis of the gestures, postures, movements, facial expressions performed by the user while viewing the program content. In one embodiment, computing device 12 may provide the user-specific reports to a remote computing system for analysis. For example, in one embodiment, the user-specific reports may be utilized by television rating agencies to determine more accurate ratings of viewed program content, in one embodiment.

In one embodiment, computing device 12 may receive preview content related to a viewed program, for one or more users, based on the user-specific reports, from a remote computing system. For example, in one embodiment, the user-specific reports may be utilized by one or more content providers or advertisers to generate preview content related to a viewed program for the users. Preview content may include, for example, content that is currently in development for a program that may be initially presented to a selected subset of users before the commencement of a public presentation of the content. For example, preview content may include alternate endings of a program, a snippet of the next episode of the program or a preview to an upcoming movie or show.

In another embodiment, computing device 12 may receive personalized content related to a viewed program, for one or more users, based on the user-specific reports, from the content providers or advertisers. Personalized content may include, for example, a selection of a set of most relevant programs that a user would like to view or customization of the type and amount of information to be conveyed to a user, while the user views a program.

In one embodiment, computing device 12 may also provide information about the user's presence in a field of view while viewing the multimedia content, the type of program viewed by the user, the user's demographic information and the user's program viewing history to one or more content providers and advertisers to receive preview content and personalized content related to the viewed program from the content providers and advertisers. For example, if it is determined that a male user in the age group 30-35 is watching a science fiction program and the user's program viewing history indicates the user's preference for science fiction, then the user may receive preview content related to a snippet of the next episode of the science fiction program or personalized content related a selection of a set of science fiction programs that the user would like to view, from the content providers and advertisers.

The preview content and the personalized content may be stored in a user preferences module 210 in the computing system 12. In one embodiment, the user preferences module 210 includes a user-specific personalized content module 204 and a user-specific preview content module 206. The user-specific personalized content module 204 stores personalized content related to a viewed program for one or more users interacting with the computing device. The user-specific preview content module 206 stores preview content related to a viewed program for one or more users interacting with the computing device. The display module 208 displays the personalized content and preview content to the users, via the audio visual device 16 connected to the computing device 12.

In one embodiment, and as discussed above, computing device 12 may directly provide the user-specific reports to one or more rating agencies, content providers and advertisers and receive preview content and personalized content from the content providers or advertisers. In an alternate embodiment, computing device 12 may also provide the user-specific reports to a user response aggregation service 502, which may then provide the user-specific reports to the rating agencies, content providers and advertisers. The operations performed by the user response aggregation service 502 are discussed in detail in FIG. 5.

Figure 3:
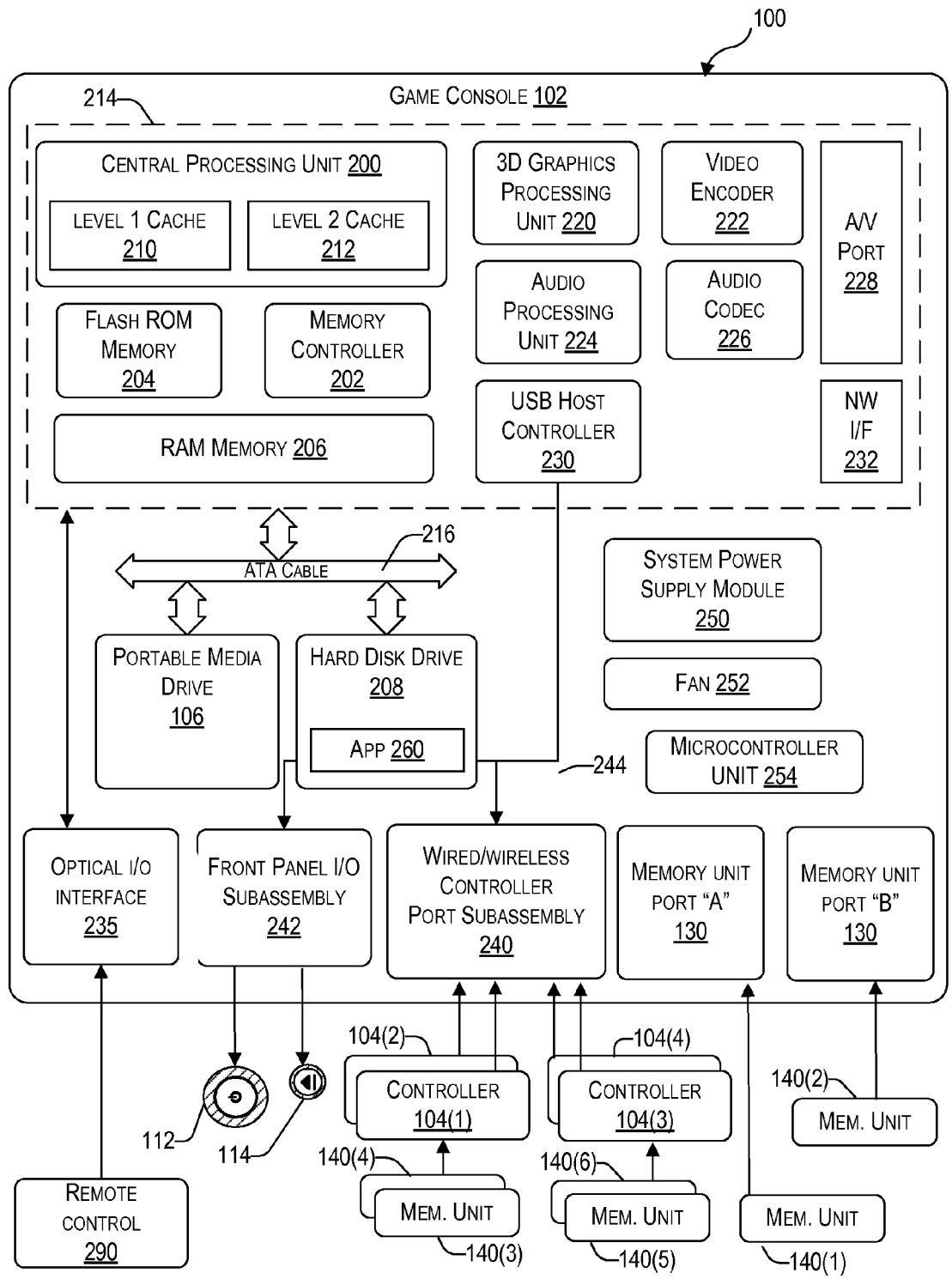
FIG. 3 illustrates an example of a computing device that may be used to implement the computing device of FIG. 1-2.

FIG. 3 illustrates an example of a computing device 100 that may be used to implement the computing device 12 of FIG. 1-2. The computing device 100 of FIG. 3 may be a multimedia console 100, such as a gaming console. As shown in FIG. 3, the multimedia console 100 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multichannel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 3 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 3, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202. A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community.

Figure 4:
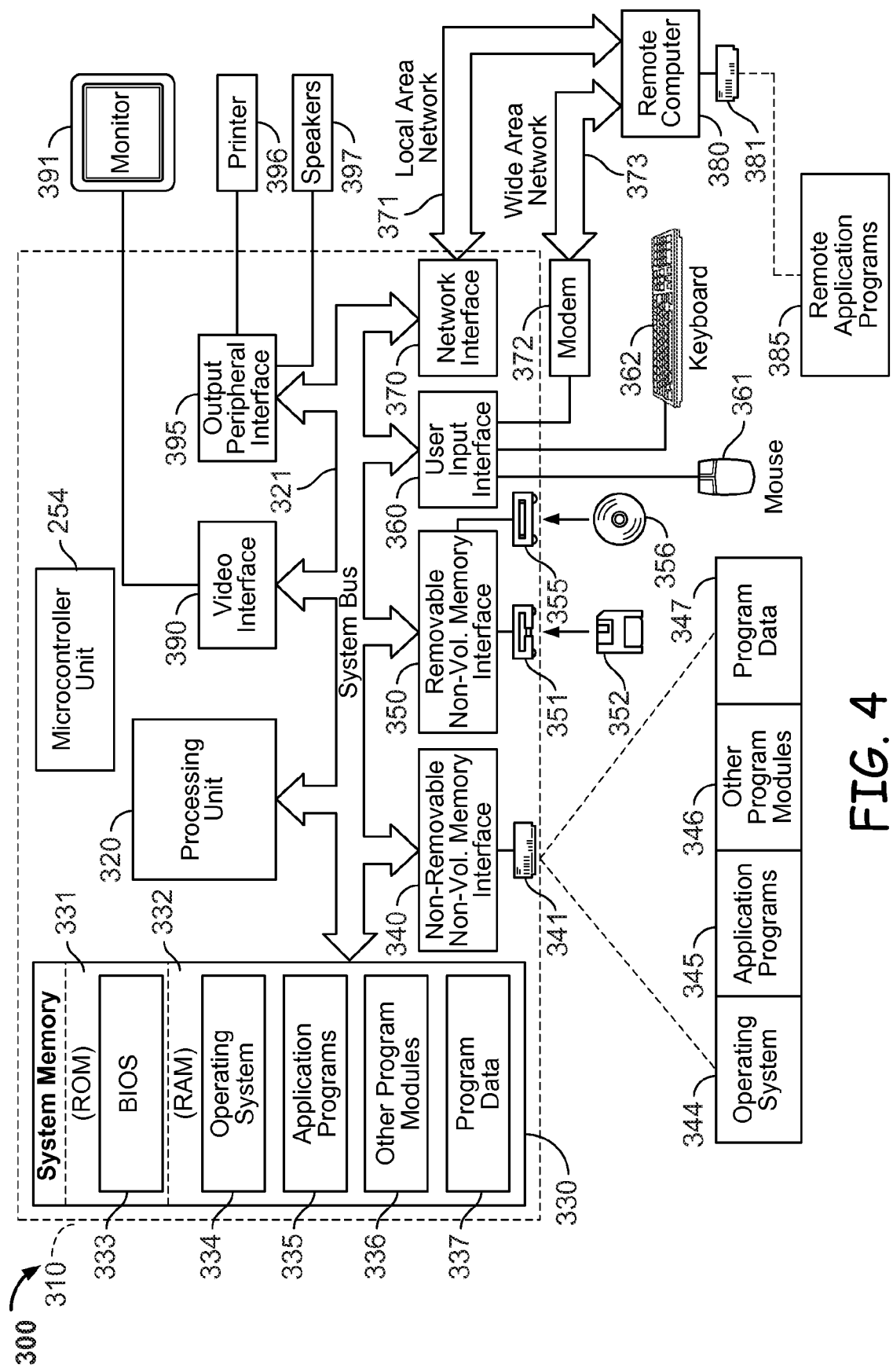
FIG. 4 illustrates a general purpose computing device which can be used to implement another embodiment of computing device 12.

FIG. 4 illustrates a general purpose computing device which can be used to implement another embodiment of computing device 12. With reference to FIG. 4, an exemplary system for implementing embodiments of the disclosed technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during startup, is typically stored in ROM 331. RAM 332 typically contains data and/or program modules that are immediately accessible to and/or presently being operated on by processing unit 320. By way of example, and not limitation, FIG. 4 illustrates operating system 334, application programs 335, other program modules 336, and program data 337.

The computer 310 may also include other removable/non-removable, volatile/nonvolatile computer storage media. By way of example only, FIG. 4 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 4, provide storage of computer readable instructions, data structures, program modules and other data for the computer 310. In FIG. 4, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 4. The logical connections depicted in FIG. 4 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 4 illustrates remote application programs 385 as residing on memory device 381. It will be appreciated that the network connections shown are exemplary and other means of establishing a communications link between the computers may be used.

In another embodiment, computing device (such as computing device 12, described in FIGS. 1-2) may be implemented as a mobile computing device. Mobile computing device may include, for example, a cell phone, a web-enabled smart phone, a personal digital assistant, a palmtop computer, a laptop computer or any similar device which communicates via wireless signals. In one embodiment, the disclosed technology may also be implemented using a head mounted display (HMD) device connected to a mobile computing device. The HMD device, in one example may be in the shape of glasses and worn on the head of a user so that the user can see through a display and thereby have an actual direct view of the space in front of the user. In one example, the HMD device may communicate wirelessly (e.g., WiFi, Bluetooth, infrared, or other wireless communication means) to a mobile computing device via a processing unit in the HMD device.

In one approach of the disclosed technology, a user may view multimedia content via the HMD device connected to the user's mobile computing device. The mobile computing device may determine a user's response to multimedia content being viewed by the user by tracking the user's movements, gestures, postures and facial expressions via a camera in the mobile computing device or the HMD device.

Figure 5:
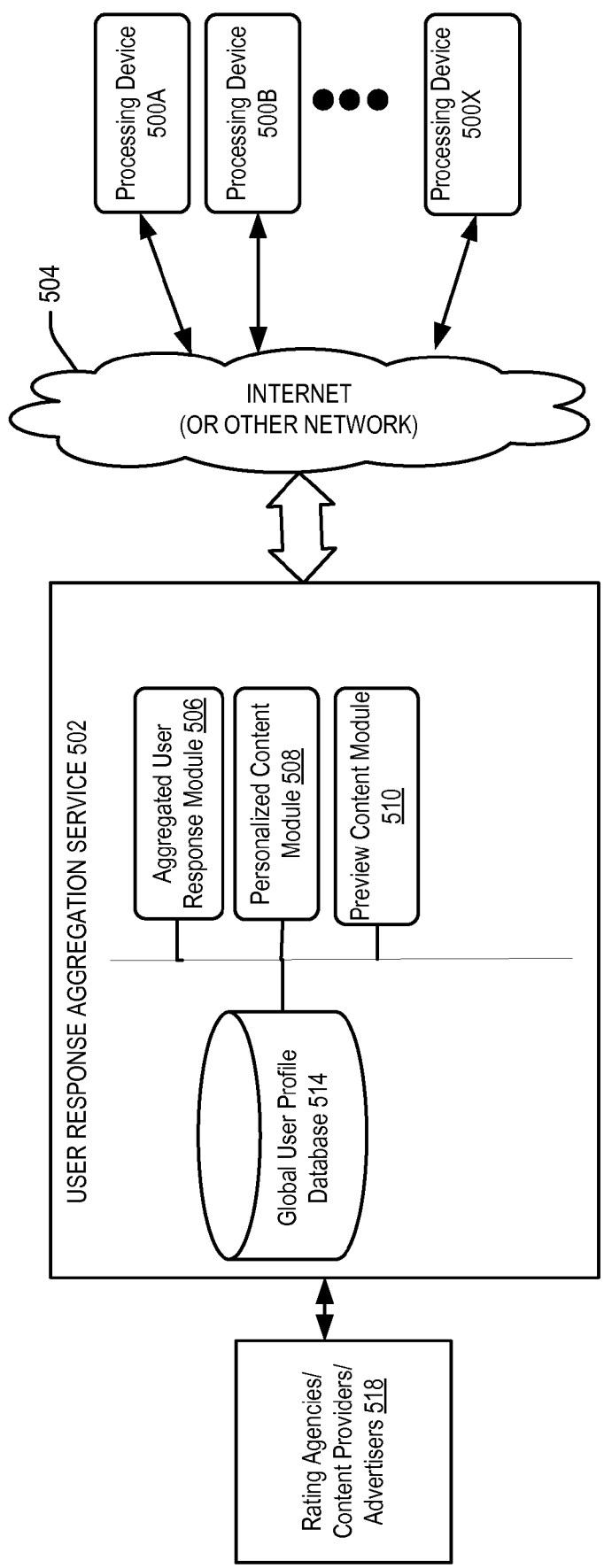
FIG. 5 illustrates an embodiment of a system for implementing the present technology.

FIG. 5 illustrates an embodiment of a system for implementing the present technology. FIG. 5 illustrates a user response aggregation service 502 which is coupled via network 504 to one or more processing devices 500A, 500B . . . 500X. Network 504 may be a public network, a private network, or a combination of public and private networks such as the Internet. Each of the processing devices 500A, 500B, . . . 500X may comprise one or more of the processing devices illustrated in FIGS. 1 through 4 herein. These include, for example, a console 500A, a console 500B, or a personal computer 500X.

In one embodiment, user response aggregation service 502 receives a user-specific report of the response to a viewed program (e.g., illustrated in "Table-1") and a user-specific report of the average response to viewed programs (e.g., illustrated in "Table-2") corresponding to one or more users, from the individual processing devices 500A, 500B and 500X. In one embodiment, the user response aggregation service 502 generates an aggregated user response report based on the user-specific reports received from the individual processing devices 500A, 500B and 500X. In one embodiment, the aggregated user response report includes responses to a viewed program received from all of the users via processing devices 500A, 500B and 500X. It is to be appreciated that the user response aggregation service 502 may aggregate user responses of any number of users interacting with the processing devices 500A, 500B and 500X, thereby enabling the collection of a large user-response data set for analysis by content providers and advertisers. In one example, the aggregated user response report may include information such as a list of users with anonymized user profiles, the top viewed program by each of the users, the program genre associated with the top viewed program and the average engagement level to each program episode of the top viewed program. The user profiles for each user may be anonymized by computing system 12 prior to providing the user profiles to the user response aggregation service 502, in one embodiment. Alternatively, the user profiles may also be anonymized by the user response aggregation service 502, in another embodiment. An exemplary illustration of the aggregated user response report is illustrated in "Table-3" as shown below:

TABLE 3

Aggregated user response report

| Users with anonymized user profiles | Top viewed program | Program Genre | Average engagement level to each program episode of top viewed program |
|---|---|---|---|
| User-1 | Program-1 | Science Fiction | {Positive, Satisfactory, Satisfactory, Positive, Negative, Positive, Positive} |
| User-2 | Program-1 | Science Fiction | {Positive, Satisfactory, Satisfactory} |
| User-n | Program-2 | Adventure | {Positive, Satisfactory, Satisfactory, Negative} |

In the example shown in "Table-3," the top viewed program and the average engagement level to each program episode may be derived from the user-specific reports illustrated in FIG. 2. For example, the top viewed program may be derived based on the percentage of program episodes of each program viewed by a user (as shown in "Table-2"). In one embodiment, the user response aggregation service 502 provides the user-specific reports (shown in "Table-1, and "Table-2") and the aggregated user response report (shown in "Table-3") to one or more of rating agencies, content providers and advertisers 518.

In certain embodiments, user response aggregation service 502 may also generate a user-specific report for all the users identified by the capture device 20. In one example, the user-specific report for all identified users may include information such as the duration of time that each user was engaged while watching the program content (for example, by detecting the duration of time that the user faced the display while viewing the program content), when each user entered the field of view, when each user left the field of view and the user's level of engagement while viewing the program content (derived from Tables-1, 2 and 3). The user-specific report for all identified users is illustrated in Table-3 below:

TABLE 3

User-specific report for all identified users in the field of view

| Users | Duration of time that user was engaged | Times when user entered FOV | Times when user left FOV | Level of Engagement to viewed program |
|---|---|---|---|---|
| User-1 | 30 minutes | 12.30 PM, 12.45 PM | 12.40 PM, 1.05 PM | Satisfactory |
| User-2 | 5 minutes | 12.30 PM | 12.35 PM | Negative |
| User-N | 45 minutes | 12.30 PM | 1.15 PM | Positive |

In another embodiment, user response aggregation service 502 receives preview content related to a viewed program, for one or more users, based on the user-specific reports and the aggregated user response report, from the content providers or advertisers. The preview content may be stored in a preview content module 510. In another embodiment, user response aggregation service 502 receives personalized content related to a viewed program, for one or more users, based on the user-specific reports and the aggregated user response report, from the content providers or advertisers. The personalized content may be stored in a personalized content module 508. In one embodiment, user response aggregation service 502 delivers the preview content and personalized content to the processing devices 500A, 500B and 500X, which may then be displayed via an audio visual device in the processing devices, to the users. As further illustrated, user response aggregation service 502 also includes a global user profile database 514. The global user profile database 514 includes information about a user's account such as a unique identifier and password associated with the user and a console identifier that uniquely identifies a user of a processing device such as 500A, 500B or 500X, and the user's profile information.

The hardware devices of FIGS. 1-5 discussed above can be used to implement a system that generates passive and anonymous feedback of program content viewed by users by tracking movements, gestures, postures and facial expressions performed by the users, while viewing the program content. The passive and anonymous feedback of program content may be provided to one or more of rating agencies, content providers and advertisers, in one embodiment. In another embodiment, the hardware devices of FIGS. 1-5 can also be used to implement a system that provides preview content and personalized content to one or more users based on the movements, gestures, postures and facial expressions performed by the users.

Figure 6:
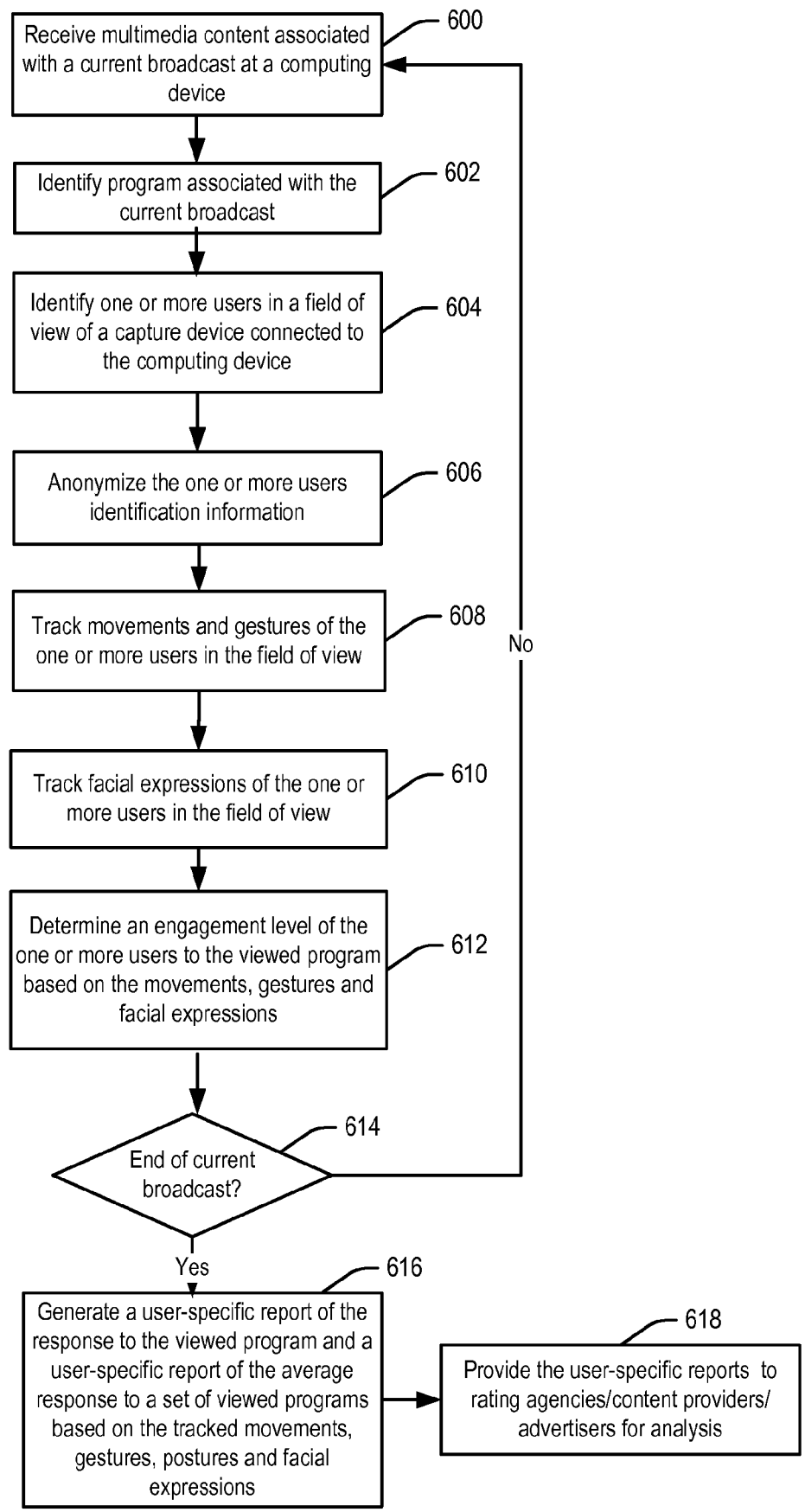
FIG. 6 is a flowchart describing one embodiment of a process for generating passive and anonymous feedback of program content viewed by a user by tracking movements, gestures, postures and facial expressions performed by the user.

FIG. 6 is a flowchart describing one embodiment of a process for generating passive and anonymous feedback of program content viewed by a user by tracking movements, gestures, postures and facial expressions performed by the user. In one embodiment, the steps of FIG. 6 may be performed by software modules in the gesture recognition engine 190, the facial recognition engine 192, user-specific response tracking module 202, user preferences module 210 and the display module 208. In step 600, multimedia content associated with a current broadcast is received and displayed. As discussed in FIG. 2, multimedia content can include any type of audio, video, and/or image media content received from media content sources such as content providers, broadband, satellite and cable companies, advertising agencies the internet or video streams from a web server. For example, multimedia content can include recorded video content, video-on-demand content, television content, television programs, advertisements, commercials, music, movies, video clips, and other on-demand media content. In one embodiment, the multimedia content may be received and displayed by the audiovisual device 16 connected to the computing device 12. In an alternate embodiment, the multimedia content may be received at the computing device 12, which may then display the multimedia content via the audiovisual device 16 to the users.

In step 602, multimedia content associated with the current broadcast is identified. In one embodiment, the multimedia content identified may include a television program, movie, a live performance or a sporting event. The multimedia content may be identified by the audio visual device 16 connected to the computing device 12, in one embodiment. Alternatively, the multimedia content may also be identified by the computing device 12. In step 604, one or more users in a field of view of the capture device 20 connected to the computing device 12 are identified. In one embodiment, the computing device 12 may determine a user's identity by receiving input from the user identifying their identity. In another embodiment, and as discussed in FIG. 2, the facial recognition engine 192 in computing device 12 may also perform the identification of users. In step 606, the user's identification information is anonymized. As discussed in FIG. 2, in one embodiment, a user's privacy concerns are met by anonymizing the user's profile information prior to implementing the disclosed technology.

In step 608, a user's movements, gestures and postures in a field of view of the capture device 12 are tracked while the user views the program. The process by which a user's movements, gestures and postures may be captured and tracked by the capture device 20 is discussed in FIG. 7. In step 610, the user's facial expressions are also tracked while the user views the program. In one embodiment, and as discussed in FIG. 2, the user's gestures, postures, movements and facial expressions may be tracked during consecutive time intervals that comprise the length of duration of the program. In step 612, an engagement level to the program viewed by the user is determined based on the gestures, postures, movements and facial expressions performed by the user. In one embodiment, and as discussed in FIG. 2, the engagement level to a program viewed by a user may be determined to be one of "positive", "satisfactory" or "negative" based on the types of movements, gestures, postures and facial expressions performed by the user while viewing the program.

In step 614, it is determined if the current broadcast has ended. If the current broadcast has not yet ended, multimedia content associated with the current broadcast is received at step 600 as discussed above. If the current broadcast has ended, then a user-specific report of the response to a viewed program and a user-specific report of the average response to programs viewed by the user are generated, in step 616. In one embodiment, the reports provide passive and anonymous feedback of program content viewed by a user by providing a detailed analysis of the user's gestures, postures, movements and facial expressions while viewing the program content. The generation of the user-specific reports is discussed in detail above with respect to FIG. 2. In step 618, the user-specific reports are transmitted to a remote system for analysis. In one embodiment, the user-specific reports are provided to rating agencies, content providers and advertisers. In one embodiment, the user-specific reports are utilized by television rating agencies to determine more accurate ratings of viewed program content.

Figure 7:
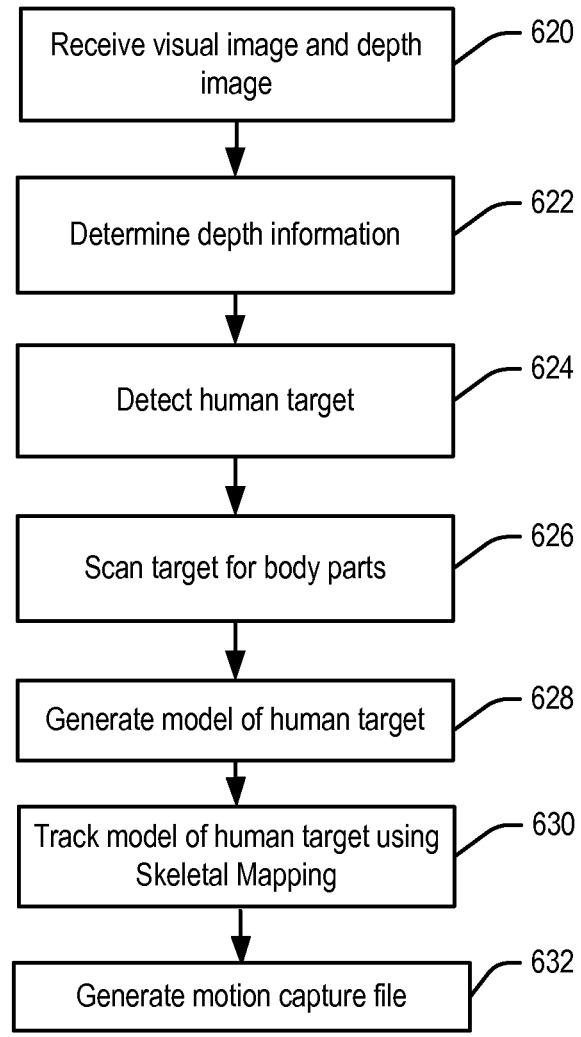
FIG. 7 is a flowchart describing one embodiment of a process for capturing and tracking user motion data from a sensor in the capture device.
Figure 8:
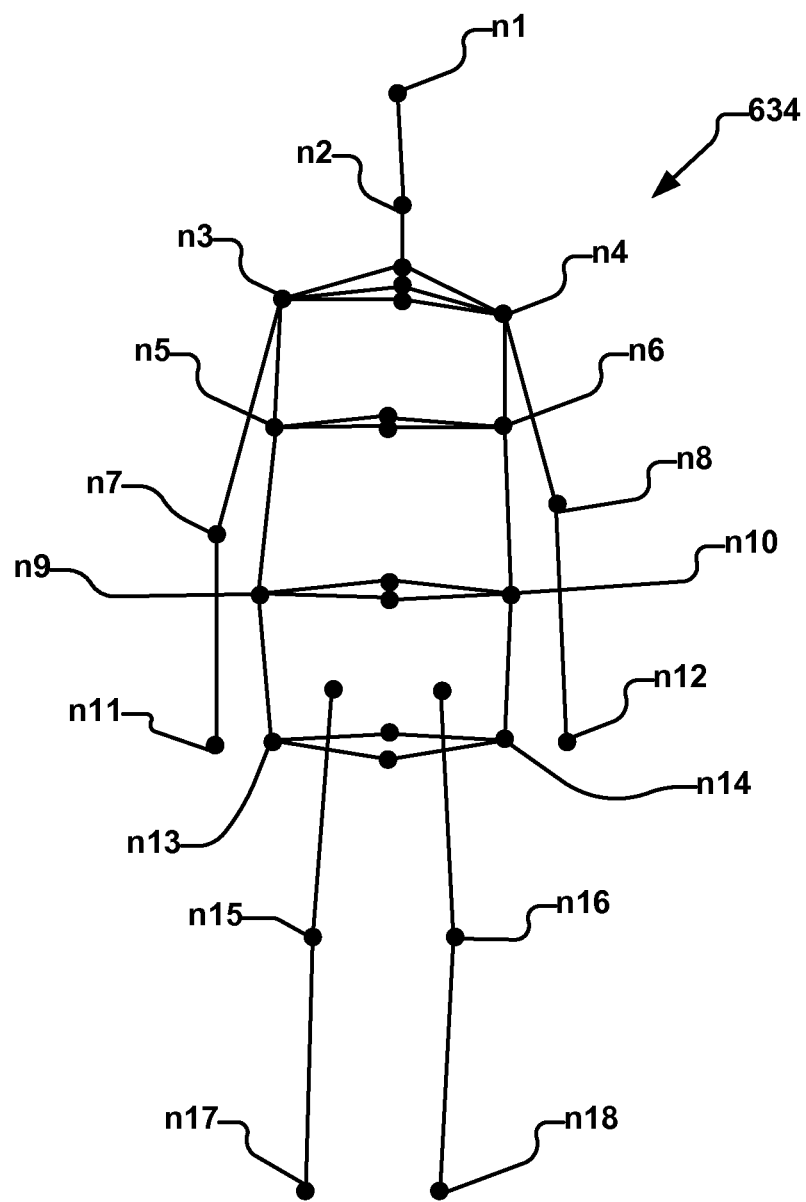
FIG. 8 illustrates an example of a skeletal model or mapping representing a scanned human target.

FIGS. 7-8 are flow charts that provide more details of various steps of FIG. 6.

FIG. 7 is a flowchart describing one embodiment of a process for capturing and tracking user motion data from a sensor in the capture device 20 (step 608 of FIG. 6). At step 620, processor 42 of the capture device 20 receives a visual image and depth image from the image capture component 32. In other examples, only a depth image is received at step 620. The depth image and visual image can be captured by any of the sensors in image capture component 32 or other suitable sensors as are known in the art. In one embodiment the depth image is captured separately from the visual image. In some implementations the depth image and visual image are captured at the same time while in others they are captured sequentially or at different times. In other embodiments the depth image is captured with the visual image or combined with the visual image as one image file so that each pixel has an R value, a G value, a B value and a Z value (representing distance).

At step 622, depth information corresponding to the visual image and depth image are determined. The visual image and depth image received at step 620 can be analyzed to determine depth values for one or more targets within the image. Capture device 20 may capture or observe a capture area that may include one or more targets.

At step 624 the capture device determines whether the depth image includes one or more human targets. In one example, each target in the depth image may be flood filled and compared to a pattern to determine whether the depth image includes a human target. In one example, the edges of each target in the captured scene of the depth image may be determined. The depth image may include a two dimensional pixel area of the captured scene. Each pixel in the 2D pixel area may represent a depth value such as a length or distance for example as can be measured from the camera. The edges may be determined by comparing various depth values associated with for example adjacent or nearby pixels of the depth image. If the various depth values being compared are greater than a pre-determined edge tolerance, the pixels may define an edge. The capture device may organize the calculated depth information including the depth image into Z layers or layers that may be perpendicular to a Z-axis extending from the camera along its line of sight to the viewer. The likely Z values of the Z layers may be flood filled based on the determined edges. For instance, the pixels associated with the determined edges and the pixels of the area within the determined edges may be associated with each other to define a target or an object in the capture area.

At step 626, the capture device scans the human target for one or more body parts. The human target can be scanned to provide measurements such as length, width or the like that are associated with one or more body parts of a user, such that an accurate model of the user may be generated based on these measurements. In one example, the human target is isolated and a bit mask is created to scan for the one or more body parts. The bit mask may be created for example by flood filling the human target such that the human target is separated from other targets or objects in the capture area elements.

At step 628 one or more models of the one or more human targets is generated (or updated) based on the scan performed at step 626. The bit mask may be analyzed for the one or more body parts to generate a model such as a skeletal model, a mesh human model or the like of the human target. For example, measurement values determined by the scanned bit mask may be used to define one or more joints in the skeletal model. The bitmask may include values of the human target along an X, Y and Z-axis. The one or more joints may be used to define one or more bones that may correspond to a body part of the human.

According to one embodiment, to determine the location of the neck, shoulders, or the like of the human target, a width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like.

In one embodiment, to determine the location of the shoulders, the width of the bitmask at the shoulder position may be compared to a threshold shoulder value. For example, a distance between the two outer most Y values at the X value of the bitmask at the shoulder position may be compared to the threshold shoulder value of a typical distance between, for example, shoulders of a human. Thus, according to an example embodiment, the threshold shoulder value may be a typical width or range of widths associated with shoulders of a body model of a human.

In one embodiment, some body parts such as legs, feet, or the like may be calculated based on, for example, the location of other body parts. For example, as described above, the information such as the bits, pixels, or the like associated with the human target may be scanned to determine the locations of various body parts of the human target. Based on such locations, subsequent body parts such as legs, feet, or the like may then be calculated for the human target.

According to one embodiment, upon determining the values of, for example, a body part, a data structure may be created that may include measurement values such as length, width, or the like of the body part associated with the scan of the bitmask of the human target. In one embodiment, the data structure may include scan results averaged from a plurality depth images. For example, the capture device may capture a capture area in frames, each including a depth image. The depth image of each frame may be analyzed to determine whether a human target may be included as described above. If the depth image of a frame includes a human target, a bitmask of the human target of the depth image associated with the frame may be scanned for one or more body parts. The determined value of a body part for each frame may then be averaged such that the data structure may include average measurement values such as length, width, or the like of the body part associated with the scans of each frame. In one embodiment, the measurement values of the determined body parts may be adjusted such as scaled up, scaled down, or the like such that measurements values in the data structure more closely correspond to a typical model of a human body. Measurement values determined by the scanned bitmask may be used to define one or more joints in a skeletal model at step 628.

At step 630 the model(s) created (or updated) in step 628 is/are tracked using skeletal mapping. For example, the skeletal model of the user 18 may be adjusted and updated as the user moves in physical space in front of the camera within the field of view. Information from the capture device may be used to adjust the model so that the skeletal model accurately represents the user. In one example this is accomplished by one or more forces applied to one or more force receiving aspects of the skeletal model to adjust the skeletal model into a pose that more closely corresponds to the pose of the human target and physical space.

At step 632, the motion determined based on the skeletal mapping is used to generate a user motion capture file. In one embodiment of step 632, the determining of the motion may include calculating the position, direction, acceleration and curvature of one or more body parts identified by the scan. The position of the body part is calculated in X, Y, Z space to create a three dimensional positional representation of the body part within the field of view of the camera. The direction of movement of the body part is calculated based upon the position. The directional movement may have components in any one of or a combination of the X, Y, and Z directions. The curvature of the body part's movement in the X, Y, Z space is determined, for example, to represent non-linear movement within the capture area by the body part. The velocity, acceleration and curvature calculations are not dependent upon the direction. It is to be appreciated that the use of X, Y, Z Cartesian mapping is provided only as an example. In other embodiments, different coordinate mapping systems can be used to calculate movement, velocity and acceleration. A spherical coordinate mapping, for example, may be useful when examining the movement of body parts which naturally rotate around joints.

Once all body parts in the scan have been analyzed, the user motion capture file generated in step 632 may be updated for the target. In one example, the user motion capture file is generated or updated in real time based on information associated with the tracked model. For example, in one embodiment the motion capture file may include the vectors including X, Y, and Z values that define the joints and bones of the model as it is being tracked at various points in time. As described above, the model being tracked may be adjusted based on user motions at various points in time and a motion capture file of the model for the motion may be generated and stored. The user motion capture file may capture the tracked model during natural movement by the user interacting with the target recognition analysis and tracking system. For example, the user motion capture file may be generated such that the user motion capture file may naturally capture any movement or motion by the user during interaction with the target recognition analysis and tracking system. The user motion capture file may include frames corresponding to, for example, a snapshot of the motion of the user at different points in time. Upon capturing the tracked model, information associated with the model including any movements or adjustment applied thereto at a particular point in time may be rendered in a frame of the user motion capture file. The information in the frame may include for example the vectors including the X, Y, and Z values that define the joints and bones of the tracked model and a time stamp that may be indicative of a point in time in which for example the user performed the movement corresponding to the pose of the tracked model.

In one embodiment, steps 620-632 are performed by capture device 20. In other embodiments, various ones of steps 620-632 may be performed by other components, such as by computing device 12. For example, the capture device 20 may provide the visual and/or depth images to the computing device 12 which will determine depth information, detect the human target, scan the target, generate and track the model and capture motion of the human target.

FIG. 8 illustrates an example of a skeletal model or mapping 634 representing a scanned human target that may be generated at step 628 of FIG. 7. According to one embodiment, the skeletal model 634 may include one or more data structures that may represent a human target as a three-dimensional model. Each body part may be characterized as a mathematical vector defining joints and bones of the skeletal model 634.

Skeletal model 634 includes joints n1-n18 (and, in some embodiments, additional joints). Each of the joints n1-n18 may enable one or more body parts defined there between to move relative to one or more other body parts. A model representing a human target may include a plurality of rigid and/or deformable body parts that may be defined by one or more structural members such as "bones" with the joints n1-n18 located at the intersection of adjacent bones. The joints n1-n18 may enable various body parts associated with the bones and joints n1-n18 to move independently of each other or relative to each other. For example, the bone defined between the joints n7 and n11 corresponds to a forearm that may be moved independent of, for example, the bone defined between joints n15 and n17 that corresponds to a calf. It is to be understood that some bones may correspond to anatomical bones in a human target and/or some bones may not have corresponding anatomical bones in the human target.

The bones and joints may collectively make up a skeletal model, which may be a constituent element of the model. An axial roll angle may be used to define a rotational orientation of a limb relative to its parent limb and/or the torso. For example, if a skeletal model is illustrating an axial rotation of an arm, a roll joint may be used to indicate the direction the associated wrist is pointing (e.g., palm facing up). By examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

Figure 9:
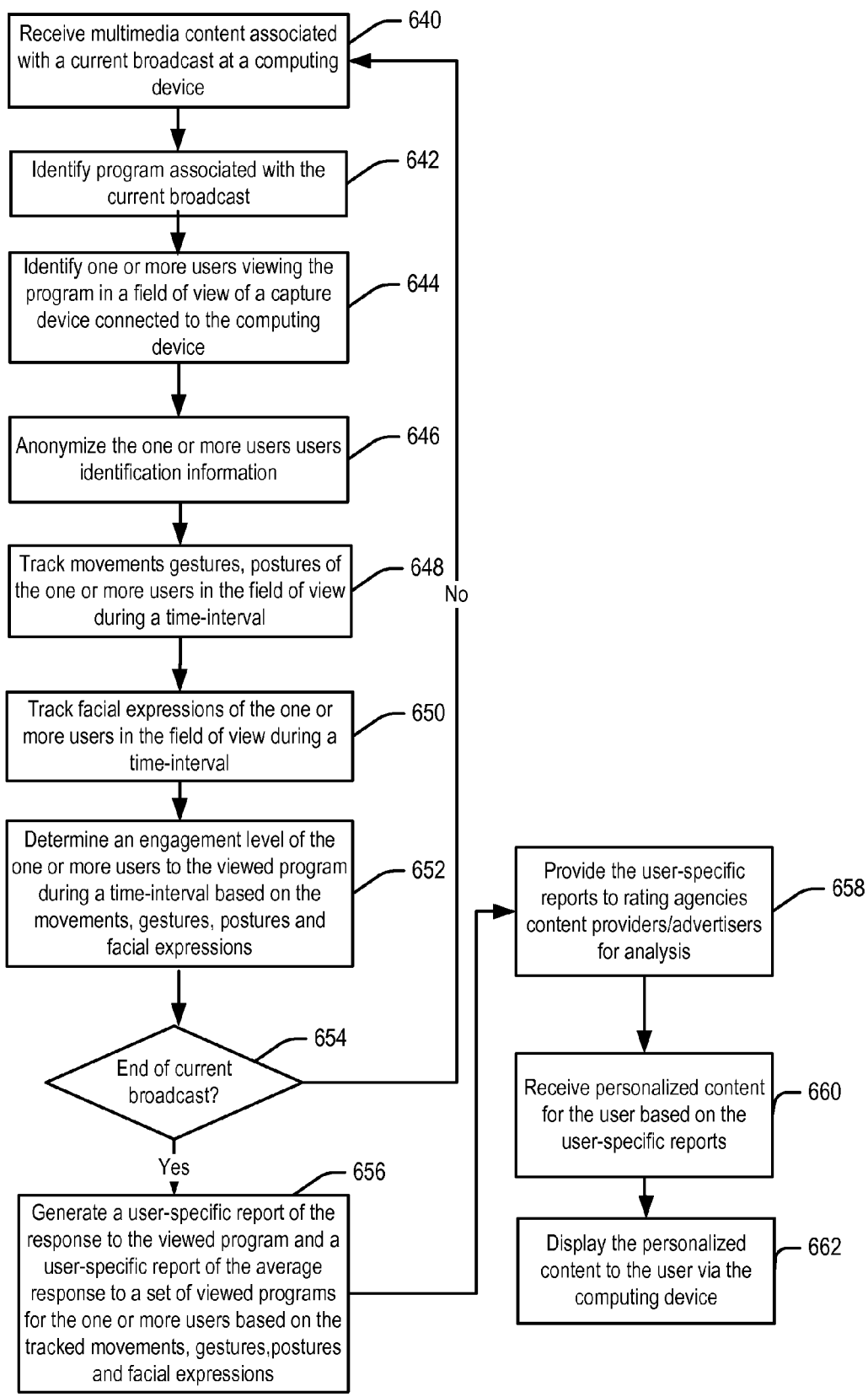
FIG. 9 is a flowchart describing one embodiment of a process for providing personalized content to a user based on movements, gestures, postures and facial expressions performed by the user.

FIG. 9 is a flowchart describing one embodiment of a process for providing personalized content to a user based on movements, gestures, postures and facial expressions performed by the user. Steps (640-656) are similar to steps (600-616) of the process described in FIG. 6. Upon generation of a user-specific report of the response to a viewed program and a user-specific report of the average response to a set of viewed programs in step 656, the user-specific reports are provided to content providers and advertisers in step 658. In step 660, personalized content related to a viewed program for one or more users is received from the content providers and advertisers. In one example, the content providers and advertisers may analyze information in the user-specific reports such as the user's engagement level to a viewed program, the user's gestures, postures, movements, facial expressions while viewing a program, and the program genre associated with the viewed program to derive personalized content related to the viewed program for the user. Personalized content may include, for example, a selection of a set of most relevant programs that a user would like to view or a customization of the type and amount of information to be conveyed to a user, while the user views a program. The personalized content may be received at the computing device 12, in one embodiment or at the audiovisual device 16 connected to the computing device 12, in another embodiment. In step 662, the personalized content is displayed to the user via the audio visual device connected to the computing device.

Figure 10:
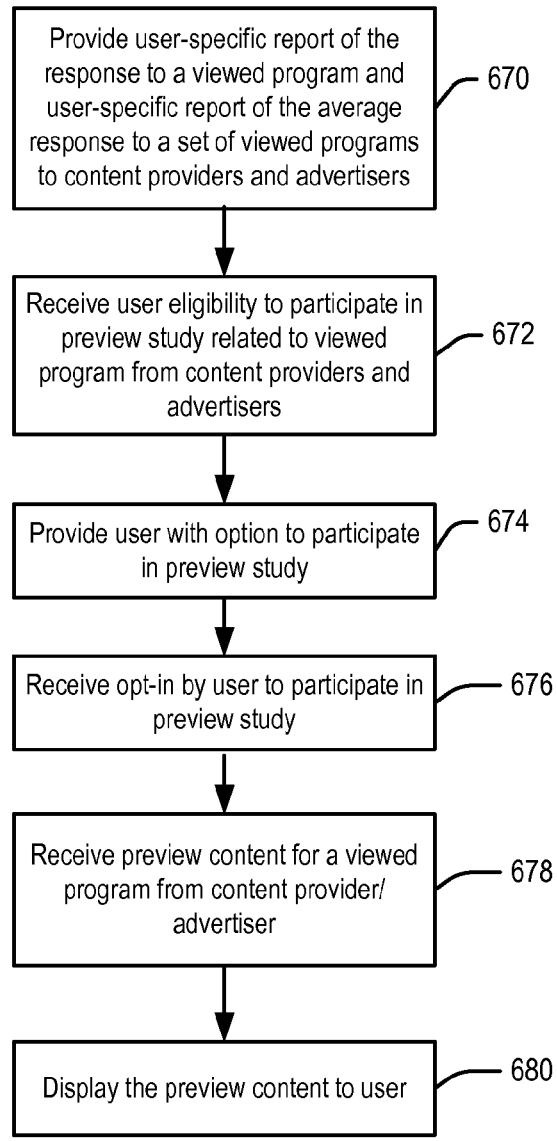
FIG. 10 is a flowchart describing one embodiment of a process for providing preview content to a user based on movements, gestures, postures and facial expressions performed by the user.

FIG. 10 is a flowchart describing one embodiment of a process for providing preview content to a user based on movements, gestures, postures and facial expressions performed by the user. In step 670, the user-specific report of the response to a viewed program and the user-specific report of the average response to a set of viewed programs generated as discussed in FIG. 2 are provided to content providers and advertisers. In step 672, user eligibility to participate in preview content related to a viewed program is received from the content providers and advertisers. Preview content may include, for example, content that is currently in development for a program that may be initially presented to a selected subset of users before the commencement of a public presentation of the content. Preview content may include, for example, alternate endings of a program, a snippet of the next episode of the program or a preview to an upcoming movie or show.

In one embodiment, user eligibility to participate in preview content related to a viewed program may be determined by the content providers and advertisers based on the percentage of program episodes viewed by a user, the average engagement level to each program episode and based on the movements, gestures, postures and facial expressions performed by the user while the user viewed the program, as determined from the user-specific reports. In step 674, the user is provided with an option to participate in a preview study based on the user eligibility determined in step 672. In step 676, an opt-in by the user to participate in a preview study may be obtained. In one example, obtaining an opt-in by a user may include prompting a user to select an option displayed via the audio visual device 16 connected to the computing device 12. In one embodiment, the audiovisual device 16 may display a menu having two options to the user. A first option may display text such as, "Do you want to participate in a preview study?" A second option may display text such as, "Do you want to continue watching the current program?"

In step 678, upon receiving an opt-in from the user to participate in a preview study, preview content for a viewed program is received and displayed to the user. In one embodiment, the preview content may be received from various media content sources such as content providers, broadband, satellite and cable companies, the internet, video streams from a web server or advertising agencies. The preview content is received at the audiovisual device 16, in one embodiment. In another embodiment, the preview content is received at the computing device 12 connected to the audio visual device. In step 680, the preview content is displayed via the audio visual device to the user.

Figure 11:
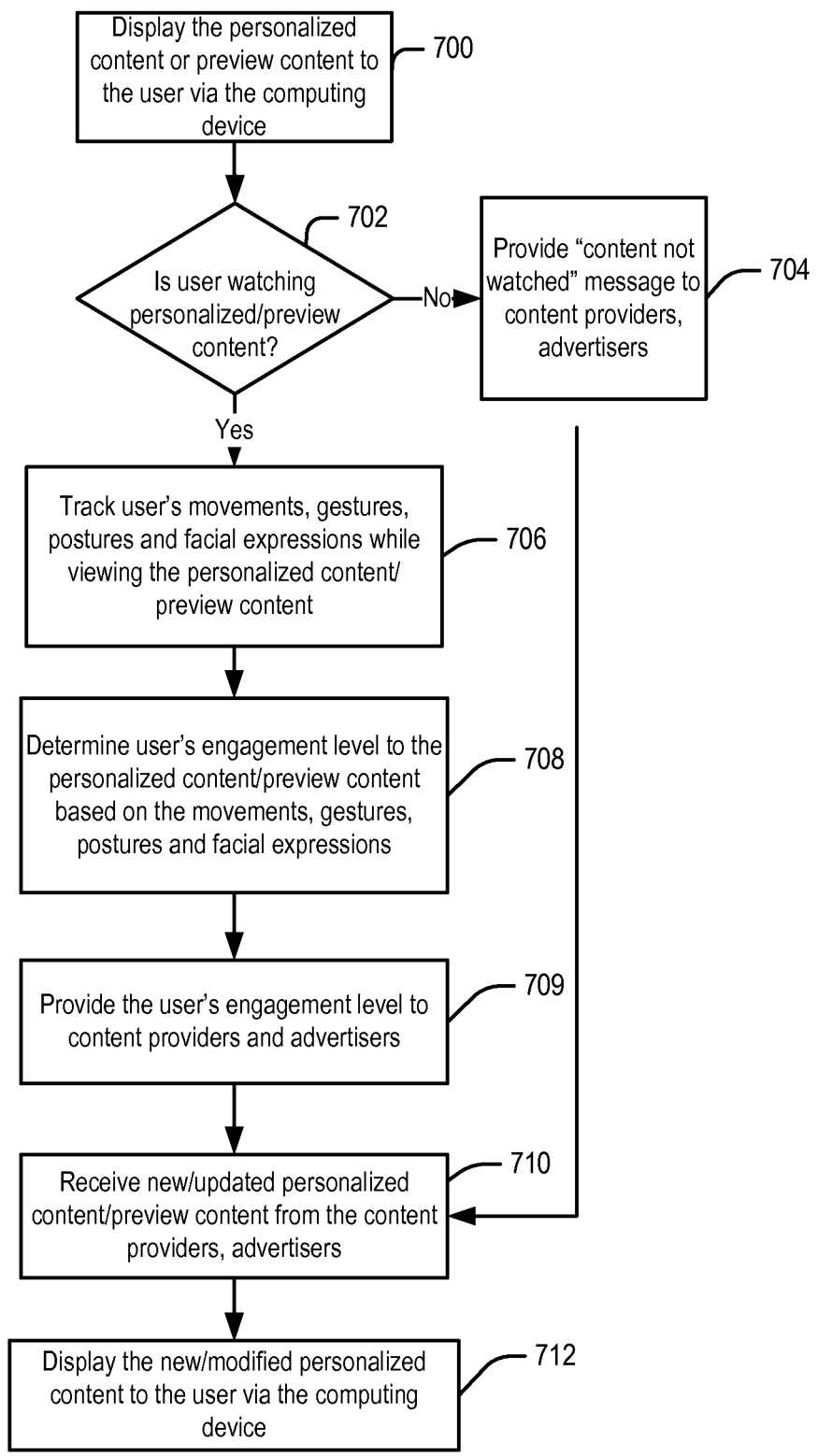
FIG. 11 is a flowchart describing one embodiment of a process for providing new or modified personalized content or preview content to a user based on feedback obtained from the user.

FIG. 11 is a flowchart describing one embodiment of a process for providing new or modified personalized content or preview content to a user based on feedback obtained from the user. In step 700, personalized content or preview content (provided to the user by content providers and advertisers as discussed in FIGS. 9 and 10 respectively) is displayed on the user's computing device. In step 702, it is determined if the user is actually watching the personalized content or the preview content. For example, it may be determined if the user is watching the personalized content or the preview content if the user's posture indicates that the user is facing the display device or if the user's facial expression or vocal response indicates one of laughter or applause. If it is determined that the user is not watching the personalized content or the preview content, then a "content not watched" feedback message is provided to the content providers and advertisers in step 704. At step 710, new or modified personalized content or preview content for the user may be received from the content providers and advertisers based on the feedback message. For example, the content providers and advertisers may modify the personalized content to display a new set of relevant programs that the user would like to view or modify the preview content to include a new alternate ending of the next episode of the program. At step 712, the new or modified personalized content or preview content is displayed to the user.

At step 702, if it is determined that the user is watching the personalized content, then the user's movements, gestures, postures and facial expressions are tracked in step 706. In step 708, the user's engagement level to the program being viewed is determined based on the user's movements, gestures, postures and facial expressions. In step 709, the user's engagement level is provided to the content providers and advertisers. The user's engagement level may be determined as discussed in FIG. 2. In step 710, new or modified personalized content for the user may be received from the content providers and advertisers based on the user's engagement level as discussed above. For example, if it is determined that the user's engagement level while viewing the personalized content is positive, then the content providers and advertisers may generate additional personalized content that includes a new or updated set of the most relevant programs that the user would like to view or provide the user with additional alternate endings of the next episode of the program. At step 712, the new or updated personalized content is displayed to the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A computer-implemented method for generating passive and anonymous feedback of multimedia content viewed by users, comprising the computer-implemented steps of:
   receiving and displaying multimedia content associated with a current broadcast;
   identifying one or more of the users in a field of view of a capture device connected to a computing device, the identifying comprising uniquely identifying the one or more users based on capturing at least one of a visual image, and a depth image associated with the one or more users;
   tracking movements, gestures and postures performed by the one or more users in the field of view by a gesture recognition engine based on a three-dimensional skeletal model which models body parts as joints and bones;
   tracking facial expressions performed by the one or more users viewing the multimedia content by a facial recognition engine based on stored facial expression filters,
   tracking vocal responses from the one or more users while viewing the multimedia content,
   automatically determining an engagement level of the one or more users to the multimedia content being viewed based on the movements, gestures, postures, the facial expressions, and the vocal responses performed by the one or more users in the field of view;
   automatically generating a report of a response to viewed multimedia content, for the one or more users, based on the movements, gestures, postures, the facial expressions, and the vocal responses performed by the one or more users, the automatically tracking and automatically generating are performed by the computing device; and
   transmitting the report of the response to the viewed multimedia content to a remote computing system.

2. The computer-implemented method of claim 1, wherein tracking the movements, gestures and postures performed by the one or more users further comprises:
   detecting whether a user moves away from the field of view, stays within the field of view, faces an audio visual device connected to the computing device, leans forward and turns away from the audio visual device while viewing the multimedia content.

3. The computer-implemented method of claim 1, wherein the facial expressions comprise one or more of smiles, laughter, cries, frowns, yawns and applauses from the one or more users.

4. The computer-implemented method of claim 1 further comprising:
   polling responses to viewed multimedia content from multiple users, aggregating the responses and transmitting the aggregated responses of the multiple users to the remote computing system for analysis.

5. The computer-implemented method of claim 4, wherein determining the engagement level of the one or more users further comprises:
   determining one of a positive, satisfactory or negative engagement level to the multimedia content viewed by the one or more users, based on the gestures, postures, movements facial expressions and vocal responses performed by the one or more users viewing the multimedia content.

6. The computer-implemented method of claim 1, wherein automatically generating a report of a response to viewed multimedia content comprises generating a user-specific report of a response to a viewed program, wherein the user-specific report further comprises:
   one or more time intervals that comprise the length of a duration of the program viewed by the one or more users, the movements, gestures, postures, vocal responses and facial expressions performed by the one or more users during each time interval and the one or more users engagement level to the viewed program during each time interval.

7. The computer-implemented method of claim 1, wherein transmitting the report of the response to a remote computing system further comprises:
   providing a user-specific report of the response to the viewed multimedia content to at least one or more of rating agencies, content providers and advertisers.

8. The computer-implemented method of claim 7, further comprising:
   receiving preview content related to the viewed multimedia content based on the user-specific report and displaying the preview content to the one or more users via an audio visual device connected to the computing device.

9. The computer-implemented method of claim 7, further comprising:
   receiving personalized content related to the viewed multimedia content based on the user-specific report and displaying the personalized content to the one or more users via an audio visual device connected to the computing device.

10. The computer-implemented method of claim 1, further comprising:
    receiving at least one of preview content or personalized content related to a viewed program being viewed for the one or more users based on detecting the one or more users presence in the field of view of the capture device which is communicatively coupled to the computing device, the type of program being viewed by the one or more users, demographic information related to the one or more users and a program viewing history related to the one or more users.

11. The computer-implemented method of claim 1 further comprising:
    the transmitting the report of the response to the viewed multimedia content to a remote computing system comprises providing the report to at least one or more of rating agencies, content providers and advertisers and receiving preview content related to the viewed multimedia content based on the report; and the transmitting the report of the response to the viewed multimedia content to a remote computing system comprises providing the report to at least one or more of rating agencies, content providers and advertisers and receiving personalized content related to the viewed multimedia content based on the report.

12. An apparatus for generating passive and anonymous feedback of multimedia content viewed by users, comprising:

a depth camera;

a computing device connected to the depth camera to receive multimedia content associated with a current broadcast, identify one or more users in a field of view of a capture device, track movements, gestures, and postures performed by the one or more users in the field of view based a three-dimensional skeletal model which models body parts as joints and bones and depth images from the depth camera, track facial expressions of the one or more users in the field of view by a facial recognition engine based on stored facial expression filters, track vocal responses from the one or more users while viewing the multimedia content, determine an engagement level of the one or more users to viewed multimedia content based on tracking the movements, gestures, postures, vocal responses and facial expressions performed by the one or more users and receive preview content and personalized content related to the viewed multimedia content for the one or more users based on the engagement level of the one or more users to the viewed multimedia content.

13. The apparatus of claim 12, wherein:

the computing device generates a user-specific report of a response to the viewed multimedia content for the one or more users based on the movements, gestures, postures, vocal responses and facial expressions performed by the one or more users, provides the user-specific report of the response to the viewed multimedia content to a remote computing system and receives preview content and personalized content related to the viewed multimedia content for the one or more users, from the remote computing system.

14. The apparatus of claim 13, wherein:

the computing device receives a user eligibility to participate in a preview study related to the viewed multimedia content from the remote computing system, wherein the user eligibility is determined based on the user-specific report of the response to the viewed multimedia content.

15. The apparatus of claim 14, wherein:

the user eligibility is further determined based on at least one of a percentage of program episodes associated with the multimedia content viewed by the one or more users and an average response to each program episode viewed by the one or more users.

16. The apparatus of claim 14, wherein:

the computing device provides the one or more users with an option to participate in the preview study, receives an opt-in by the one or more users to the participate in the preview study and receives the preview content for the viewed multimedia content from the remote computing system.

17. The apparatus of claim 12, further comprising:

an audio visual device connected to the computing device, the audio visual device displays at least one of the preview content and the personalized content to the one or more users, the computing device determines the engagement level of the one or more users while viewing the preview content and the personalized content by tracking the movements, gestures, postures and facial expressions of the one or more users, provides the engagement level to one or more content providers and advertisers for analysis and receives at least one of new preview content, new personalized content, modified preview content or modified personalized content from the content providers and advertisers, based on the analysis.

18. One or more processor readable storage devices having processor readable code embodied on said one or more processor readable storage devices, the processor readable code for programming one or more processors to perform a method comprising:

tracking movements, gestures and postures performed by the one or more users in the a field of view of a capture device communicatively coupled to the one or more processors based on a three-dimensional skeletal model which models body parts as joints and bones during displaying of multimedia content;

tracking vocal responses from the one or more users while viewing the multimedia content, automatically determining an engagement level of the one or more users to the multimedia content being viewed by the one or more users based on the tracking the movements, gestures, vocal responses and postures performed by the one or more users;

automatically generating a report about the response of the one or more users to the multimedia content based on the tracking the movements, gestures, vocal responses and postures performed by the one or more users;

transmitting the report to a remote computing system;

receiving personalized content related to the multimedia content for the one or more users based on the transmitted report; and causing the personalized content to be displayed.

19. One or more processor readable storage devices according to claim 18, wherein tracking the movements, gestures, vocal responses and postures performed by the one or more users further comprises:

detecting whether a user turns away from an audio visual device displaying the multimedia content.

* * * * *